US012449959B2

(12) United States Patent
Jablonski et al.

(10) Patent No.: US 12,449,959 B2
(45) Date of Patent: *Oct. 21, 2025

(54) TECHNIQUES FOR IMPLEMENTING ROLLBACK OF INFRASTRUCTURE CHANGES IN A CLOUD INFRASTRUCTURE ORCHESTRATION SERVICE

(71) Applicant: Oracle International Corporation, Redwood Shores, CA (US)

(72) Inventors: Greg Mark Jablonski, Seattle, WA (US); Nathaniel Martin Glass, Bellevue, WA (US); Eric Tyler Barsalou, Seattle, WA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 207 days.

This patent is subject to a terminal disclaimer.

(21) Appl. No.: 17/939,852

(22) Filed: Sep. 7, 2022

(65) Prior Publication Data
US 2023/0004443 A1  Jan. 5, 2023

Related U.S. Application Data

(63) Continuation of application No. 16/925,108, filed on Jul. 9, 2020, now Pat. No. 11,467,879.
(Continued)

(51) Int. Cl.
G06F 11/00 (2006.01)
G06F 3/0484 (2022.01)
(Continued)

(52) U.S. Cl.
CPC ........ *G06F 3/04842* (2013.01); *G06F 3/0484* (2013.01); *G06F 8/60* (2013.01);
(Continued)

(58) Field of Classification Search
CPC ............ G06F 11/0709; G06F 11/0793; G06F 11/1469; G06F 11/3664
See application file for complete search history.

(56) References Cited

U.S. PATENT DOCUMENTS 9,612,815 B1 * 4/2017 Jagtap ........................ G06F 8/61
9,882,833 B2 * 1/2018 McBride ............... H04L 47/762
(Continued)

OTHER PUBLICATIONS

U.S. Appl. No. 16/925,108, Non-Final Office Action mailed on Apr. 12, 2022, 12 pages.
(Continued)

*Primary Examiner* — Charles Ehne
(74) *Attorney, Agent, or Firm* — Kilpatrick Townsend & Stockton LLP

(57) ABSTRACT

Techniques for implementing rollback of infrastructure changes in an infrastructure orchestration service are described. In certain examples, an infrastructure orchestration service is disclosed that manages both provisioning and deploying of infrastructure assets within a cloud environment. The service receives a plan comprising a set of instructions associated with a set of infrastructure assets of an execution target and identifies a first state of the set of infrastructure assets. The service executes the set of instructions in the plan to achieve a second state for the set of infrastructure assets. Based in part on the executing, the service receives a trigger for rolling back the plan to restore the set of infrastructure assets in the plan to the first state and executes a rollback plan for the plan. The service then transmits a result associated with the execution of the rollback plan.

20 Claims, 12 Drawing Sheets

Related U.S. Application Data

(60) Provisional application No. 62/963,456, filed on Jan. 20, 2020, provisional application No. 62/963,478, filed on Jan. 20, 2020, provisional application No. 62/963,486, filed on Jan. 20, 2020, provisional application No. 62/963,413, filed on Jan. 20, 2020, provisional application No. 62/963,477, filed on Jan. 20, 2020, provisional application No. 62/963,335, filed on Jan. 20, 2020, provisional application No. 62/963,489, filed on Jan. 20, 2020, provisional application No. 62/963,481, filed on Jan. 20, 2020, provisional application No. 62/963,452, filed on Jan. 20, 2020, provisional application No. 62/963,480, filed on Jan. 20, 2020, provisional application No. 62/963,491, filed on Jan. 20, 2020.

(51) Int. Cl.

| | | |
|---|---|---|
| *G06F 3/04842* | (2022.01) | |
| *G06F 8/60* | (2018.01) | |
| *G06F 8/71* | (2018.01) | |
| *G06F 9/38* | (2018.01) | |
| *G06F 9/4401* | (2018.01) | |
| *G06F 9/445* | (2018.01) | |
| *G06F 9/451* | (2018.01) | |
| *G06F 9/48* | (2006.01) | |
| *G06F 9/50* | (2006.01) | |
| *G06F 11/07* | (2006.01) | |
| *G06F 11/14* | (2006.01) | |
| *G06F 11/32* | (2006.01) | |
| *G06F 11/3668* | (2025.01) | |
| *G06F 11/3698* | (2025.01) | |
| *G06F 16/901* | (2019.01) | |
| *H04L 41/0806* | (2022.01) | |
| *H04L 41/0816* | (2022.01) | |
| *H04L 41/0895* | (2022.05) | |
| *H04L 41/122* | (2022.01) | |
| *H04L 41/40* | (2022.01) | |
| *H04L 41/50* | (2022.01) | |
| *H04L 41/5041* | (2022.01) | |
| *H04L 41/5054* | (2022.01) | |
| *H04L 67/00* | (2022.01) | |
| *H04L 67/10* | (2022.01) | |
| *H04L 67/1008* | (2022.01) | |
| *H04L 67/1031* | (2022.01) | |
| *H04L 67/566* | (2022.01) | |
| *G06F 8/61* | (2018.01) | |

(52) U.S. Cl.
CPC .............. *G06F 8/71* (2013.01); *G06F 9/3836* (2013.01); *G06F 9/4411* (2013.01); *G06F 9/44505* (2013.01); *G06F 9/451* (2018.02); *G06F 9/485* (2013.01); *G06F 9/4856* (2013.01); *G06F 9/5011* (2013.01); *G06F 9/5022* (2013.01); *G06F 9/5027* (2013.01); *G06F 9/5038* (2013.01); *G06F 9/505* (2013.01); *G06F 9/5061* (2013.01); *G06F 9/5072* (2013.01); *G06F 9/5077* (2013.01); *G06F 11/0757* (2013.01); *G06F 11/1469* (2013.01); *G06F 11/327* (2013.01); *G06F 11/3684* (2013.01); *G06F 11/3698* (2025.01); *G06F 16/9024* (2019.01); *H04L 41/0806* (2013.01); *H04L 41/0816* (2013.01); *H04L 41/0895* (2022.05); *H04L 41/122* (2022.05); *H04L 41/40* (2022.05); *H04L 41/5041* (2013.01); *H04L 41/5048* (2013.01); *H04L 41/5054* (2013.01); *H04L 41/5096* (2013.01); *H04L 67/10* (2013.01); *H04L 67/1008* (2013.01); *H04L 67/1031* (2013.01); *H04L 67/34* (2013.01); *H04L 67/566* (2022.05); *G06F 8/61* (2013.01); *G06F 11/0709* (2013.01); *G06F 11/0751* (2013.01); *G06F 11/0793* (2013.01)

(56) References Cited

U.S. PATENT DOCUMENTS

| | | | |
|---|---|---|---|
| 11,528,185 B1* | 12/2022 | Hrbek | ................ H04L 41/0886 |
| 2010/0125664 A1* | 5/2010 | Hadar | .............. G06Q 10/06393 |
| | | | 709/227 |
| 2010/0257403 A1 | 10/2010 | Virk et al. | |
| 2015/0121155 A1* | 4/2015 | Boshev | ............... H04L 41/0893 |
| | | | 714/48 |
| 2016/0378615 A1 | 12/2016 | Cohen et al. | |
| 2018/0309623 A1 | 10/2018 | Szobi et al. | |
| 2019/0171966 A1 | 6/2019 | Rangasamy | |
| 2019/0229987 A1* | 7/2019 | Shelke | ................ G06F 9/45558 |
| 2022/0052916 A1 | 2/2022 | Fedida et al. | |

OTHER PUBLICATIONS

U.S. Appl. No. 16/925,108, Notice of Allowance mailed on Jul. 20, 2022, 7 pages.

\* cited by examiner

TECHNIQUES FOR IMPLEMENTING ROLLBACK OF INFRASTRUCTURE CHANGES IN A CLOUD INFRASTRUCTURE ORCHESTRATION SERVICE

CROSS-REFERENCE TO RELATED APPLICATIONS

The present application is a continuation of, and claims the benefit of and priority to, U.S. patent application Ser. No. 16/925,108 filed on Jul. 9, 2020, the entire contents of which are incorporated herein by reference for all purposes.

U.S. patent application Ser. No. 16/925,108 is a non-provisional application of, and claims the benefit and priority under 35 U.S.C. 119(e) of the following U.S. Provisional applications, the entire contents of which are incorporated by reference for all purposes:

- U.S. Provisional Application No. 62/963,335, filed Jan. 20, 2020, entitled "TECHNIQUES FOR DEPLOYING INFRASTRUCTURE RESOURCES WITH A DECLARATIVE PROVISIONING TOOL";
- U.S. Provisional Application No. 62/963,413, filed Jan. 20, 2020, entitled "TECHNIQUES FOR DETECTING DRIFT IN A DEPLOYMENT ORCHESTRATOR";
- U.S. Provisional Application No. 62/963,456, filed Jan. 20, 2020, entitled "USER INTERFACE TECHNIQUES FOR AN INFRASTRUCTURE ORCHESTRATION SERVICE";
- U.S. Provisional Application No. 62/963,477, filed Jan. 20, 2020, entitled "TECHNIQUES FOR UTILIZING DIRECTED ACYCLIC GRAPHS FOR DEPLOYMENT INSTRUCTIONS";
- U.S. Provisional Application No. 62/963,478, filed Jan. 20, 2020, entitled "TECHNIQUES FOR RESOLVING APPLICATION UPDATES";
- U.S. Provisional Application No. 62/963,480, filed Jan. 20, 2020, entitled "TECHNIQUES FOR MANAGING DEPENDENCIES OF AN ORCHESTRATION SERVICE";
- U.S. Provisional Application No. 62/963,452, filed Jan. 20, 2020, entitled "TECHNIQUES FOR ROLLBACK OF AN INFRASTRUCTURE ORCHESTRATION SERVICE";
- U.S. Provisional Application No. 62/963,486 filed Jan. 20, 2020, entitled "TECHNIQUES FOR DEPLOYING INFRASTRUCTURE COMPONENTS IN PHASES";
- U.S. Provisional Application No. 62/963,489, filed Jan. 20, 2020, entitled "TECHNIQUES FOR MANAGING LONG-RUNNING TASKS WITH A DECLARATIVE PROVISIONER";
- U.S. Provisional Application No. 62/963,481, filed Jan. 20, 2020, entitled "TECHNIQUES FOR TRANSFERRING DATA ACROSS AIR GAPS"; and
- U.S. Provisional Application No. 62/963,491, filed Jan. 20, 2020, entitled "TECHNIQUES FOR PREVENTING CONCURRENT EXECUTION OF DECLARATIVE INFRASTRUCTURE PROVISIONERS".

BACKGROUND

Today, cloud infrastructure services utilize many individual services to provision and deploy code and configuration (respectively) across the cloud infrastructure service's many regions. These tools require significant manual effort to use, especially given that provisioning is generally declarative and deploying code is imperative. Additionally, as the number of service teams and regions grows, the cloud infrastructure service will need to continue to grow. Some cloud infrastructure service's strategies of deploying to a larger number of smaller regions includes per-region expenditures, which may not scale well.

BRIEF SUMMARY

Techniques for implementing rollback of infrastructure changes in an infrastructure orchestration service are described. In certain examples, an infrastructure orchestration service is disclosed that manages both provisioning and deploying of infrastructure assets within a cloud environment. The service receives a plan comprising a set of instructions associated with a set of infrastructure assets of an execution target and identifies a first state of the set of infrastructure assets. The service executes the set of instructions in the plan to achieve a second state for the set of infrastructure assets. Based at least in part on the executing, the service receives a trigger for rolling back the plan to restore the set of infrastructure assets in the plan to the first state and executes a rollback plan for the plan. The service then transmits a result associated with the execution of the rollback plan.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

Figure 1:
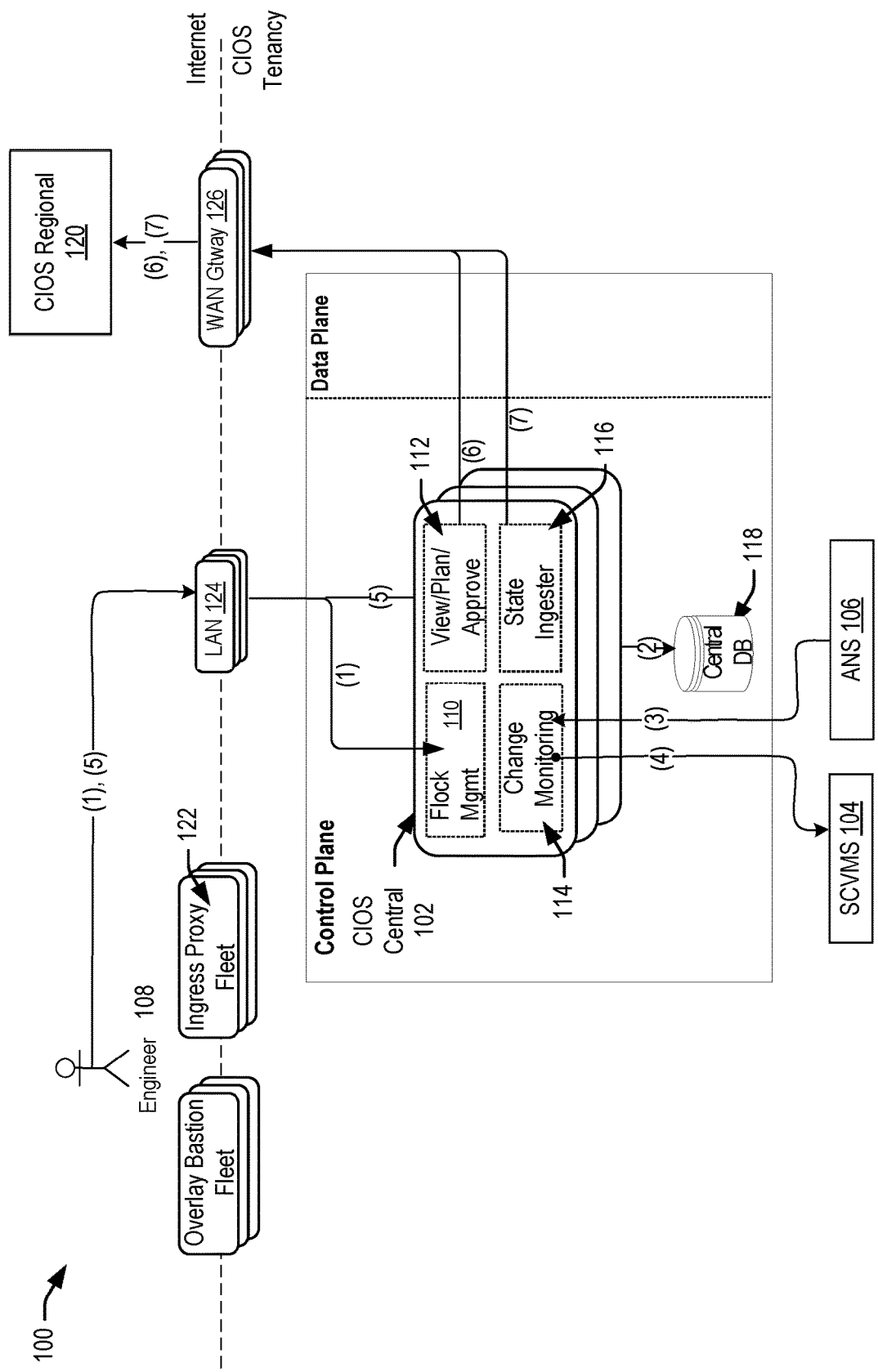
FIG. 1 is a block diagram of an architecture for implementing at least some elements of a cloud infrastructure orchestration service, according to at least one embodiment.

In some examples, infrastructure as a service (IaaS) is one particular type of cloud computing. IaaS can be configured to provide virtualized computing resources over a public network (e.g., the Internet). In some examples, IaaS is one of the three main categories (or sub-categories) of cloud computing services. Most consider the other main categories to be software as a service (SaaS) and platform as a service (PaaS), and sometimes SaaS may be considered a broader category, encompassing both PaaS and IaaS, with even some considering IaaS to be a sub-category of PaaS as well.

In an IaaS model, a cloud computing provider can host the infrastructure components (e.g., servers, storage devices, network nodes (e.g., hardware), deployment software, platform virtualization (e.g., a hypervisor layer), or the like).

In some cases, an IaaS provider may also supply a variety of services to accompany those infrastructure components (e.g., billing, monitoring, logging, security, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) in each VM, deploy middleware, such as databases, create storage buckets for workloads and backups, and install even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., selling) IaaS. An entity might also opt to deploy a private cloud, becoming its own provider of infrastructure services.

In some examples, IaaS deployment is the process of putting a new application, or a new version, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different problems for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more security group rules provisioned to define how the security of the network will be set up and one or more virtual machines (VMs). Other infrastructure elements may also be provisioned, such as a load balancer, a database, or the like. As more and more infrastructure elements are desired and/or added, the infrastructure may incrementally evolve.

As noted above, one way to provision the infrastructure is to describe it declaratively. As such, the configuration file may be a declarative file that merely describes each of the infrastructure components noted above and how they interact. The configuration file can describe the resource and the relevant fields needed to create the element, and then as other elements can be described that reference the previously described elements. In some examples, a provisioning tool can then generate a workflow for creating and managing the elements that are described in the configuration file.

In some instances, the workflow of the provisioning tool may be configured to perform various commands. One function that can be performed is view reconciliation, where the provisioning tool can compare the view of the current infrastructure (e.g., the expected state of the infrastructure) with how the infrastructure is actually running. In some instances, performing the view reconciliation function may include querying various resource providers or infrastructure resources to identify what resources are actually running. Another function that the provisioning tool can perform is plan generation, where the provisioning tool can compare the actually running infrastructure components with what the provisioning tool wants the state to look like (e.g., the desired configuration). In other words, the plan generation function can determine what changes need to be made to bring the resources up to the most current expectations. In some instances, a third function is the execution (e.g., apply) function, where the provisioning tool can execute the plan generated by the plan generation function.

In general, provisioning tools may be configured take the configuration file, parse the declarative information included therein, and programmatically/automatically determine the order in which the resources need to be provisioned in order to execute the plan. For example, if the VPC needs to be booted before the security group rules and VMs are booted, then the provisioning tool will be able to make that determination and implement the booting in that order without user intervention and/or without that information necessarily being included in the configuration file.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

As noted above, generally there are two different tools used to handle each of the provisioning of infrastructure resources and the deployments of code to control the infrastructure resources, with orchestration between the two tools being performed manually. However, at scale, manual implementation always leads to deviations. Thus, an automated tool that can both provision and deploy a virtual infrastructure enables more efficient and reliable techniques for implementing a virtual cloud environment.

In some examples, when two tools are used, issues can arise when a user manually makes changes to the code between the provisioning phase and the deployment phase. As described herein, a technique that uses a single tool for both provisioning and deploying can alleviate that by automating the process, such that there isn't an opportunity for manual code changes. It may be the case, that a slight change to the way in which one user codes something, can create major issues in the deployment phase. In some examples, the first time an operator performs an action in a new region (e.g., a typo in the code), the object that was coded with the typo may be that way forever. If the application is deployed with that typo, and the application is not sensitive to that typo (e.g., it still works), it is possible that some time down the road, an additional code change could become sensitive to that typo, and crash the entire system. Thus, the techniques provided herein can remove the gap between provisioning and deployment that can often lead to problems.

In general, modeling deployments is declarative such that a configuration file can be used to declare the infrastructure resources. For example, create, read, update, delete (CRUD) instructions are generally used to generate deployment files using general Representational State Transfer (REST) concepts (e.g., REST Application Programming Interfaces (APIs)). However, deployment itself doesn't generally follow the same concept. Additionally, while the infrastructure provisioning tools tend to be really powerful and/or expressive, the tools for deployment tend to be much more restrictive regarding the operations they can perform (e.g., they are imperative as opposed to declarative). Thus, there has been a long-felt need for a tool that can handle both functional requirements (e.g., provisioning and deployment of infrastructure elements) within a cloud environment.

In some examples, techniques for implementing a cloud infrastructure orchestration service (CIOS) are described herein. Such techniques, as described briefly above, can be configured to manage both provisioning and deploying of infrastructure assets within a cloud environment. In some instances, the CIOS can include two classes of service: the Central and Regional components (e.g., CIOS Central and CIOS Regional). Additional details related to the techniques employed by the CIOS Central and CIOS Regional components for provisioning and deploying of infrastructure assets within a cloud environment is described in FIGS. 1-2 below.

In certain embodiments, the CIOS Regional component is configured to manage regional instances and/or deployments of CIOS Central and store and manage execution plans that pertain to a particular region. In certain examples, the CIOS Regional System is configured to orchestrate (e.g., coordinate) the execution of a plan to provision and deploy the infrastructure resources defined in a configuration file by breaking the plan down into a series of tasks.

The following terms will be used throughout the present disclosure:

Infrastructure component—A long-lived piece of infrastructure that supports running code.
Examples: a deployment application, a load balancer, a domain name system (DNS) entry, an object storage bucket, etc.

Artifact—Code being deployed to a deployment application or a Kubernetes engine cluster, or configuration information (hereinafter, "config") being applied to an infrastructure component. These may be read-only resources.

Deployment task—A short-lived task that is often associated with deploying or testing code. Additionally, the deployment tasks are modeled as resources that live no longer than the release that creates them.
Examples: "deploy $artifact to $environment," "watch $alarm for 10 minutes," "execute $testSuite," or "wait for $manualApproval"
For example, CIOS can model a deployment orchestrator deployment as the creation of a resource that transitions to the Available state when it completes.
Because CIOS maintains the state of its associated declarative provisioner, CIOS can control the lifecycle of these short-lived resources as it relates to releases.

Resource—a CRUD'able resource.
CIOS models each of the constructs listed above as a resource. The next section discusses this modeling in detail.

Flock—CIOS's model encapsulating a control plane and all its components. Exists primarily to model ownership of and point at the infrastructure components.

Flock config—Describes the set of all infrastructure components, artifacts, and deployment tasks associated with a single service.
Each Flock has exactly one Flock configuration. Flock configurations are checked in to source control.
Flock configurations are declarative. They expect CIOS to provide realm, region, ad, and artifact versions as input.
Flocks are granular—a Flock consists of a single service and supporting infrastructure.

State—A point-in-time snapshot of the state of every resource in the flock.

Release—A tuple of a specific version of a flock configuration and a specific version of every artifact that it references.
Think of a release as describing a state that may not yet exist.

Release plan—The set of steps that the CIOS would take to transition all regions from their current state to the state described by a release.
Release plans have a finite number of steps and a well-defined start and end time.

Apply—This is a noun. A single attempt to execute a Release plan. An Execution changes the current State of the Flock.

CIOS can be described as an orchestration layer that applies configuration to downstream systems (e.g., worldwide). It is designed to allow world-wide infrastructure provisioning and code deployment with no manual effort from service teams (e.g., beyond an initial approval in some instances). The high level responsibilities of CIOS include, but are not limited to:

Providing teams with a view in to the current state of resources managed by CIOS, including any in-flight change activity.

Helping teams plan and release new changes.

Coordinating activity across various downstream systems within a region to execute approved release plans with no human intervention.

Coordinating activity across regions/realms to execute approved release plans world-wide.

In some examples, CIOS handles onboarding by enabling teams to provide CIOS with configuration information via checked-in code. Additionally, CIOS can automate more things, so this is a heavier-weight exercise than in previous implementations. In some instances, CIOS handles pre-deployment by offering teams the ability to automatically deploy and test code. In some instances, CIOS can handle the writing of change management (CM) policy by enabling automatically generating plans to roll out new artifacts (e.g., world-wide) when a team builds them. It can do this by inspecting the current state of each region and the current CIOS configuration (which, can itself be an artifact). Additionally, teams can inspect these plans, and may iterate on them by changing the CIOS configuration and asking CIOS to re-plan. Once the team is satisfied with a plan, they can create a "release" that references the plan. The plan can then be marked as approved or rejected. While teams can still write CMs, they are just pointers to the CIOS plan. Thus, teams can spend less time reasoning about the plan. Plans are more accurate because they are machine generated. Plans are almost too detailed for human consumption; however, it can be displayed via a sophisticated user interface (UI).

In some examples, CIOS can handle execution of CMs by automatically executing the deployment plan. Once release plan has been created and approved, engineers no longer participate in CMs unless CIOS initiates roll-back. In some cases, this may require teams to automate tasks that are currently manual. In some examples, CIOS can handle rolling back a change management (CM) by automatically generating a plan that returns the flock to its original (e.g., pre-release) state when CIOS detects service health degradation while executing. In some examples, CIOS can handle deploying emergent/tactical changes by receiving a release plan that is scoped to a subset of regions and/or a subset of the resources managed by CIOS, and then executing the plan.

Additionally, CIOS may support primitives necessary to define fully automated world-wide deployments. For example, CIOS can measure service health by monitoring alarms and executing integration tests. CIOS can help teams quickly define roll-back behavior in the event of service degradation, then can execute it automatically. CIOS can automatically generate and display release plans and can track approval. In some instances, the language that teams use to describe desired deployment behavior may be declarative. CIOS can combine the functionality of code deployment and infrastructure configuration (e.g., provisioning) in one system. CIOS also supports flexible ordering across regions, and across components within a region. Teams can express ordering via checked-in configuration. Teams may call CIOS's planning and release APIs programmatically.

FIG. 1 depicts an architecture 100 for illustrating techniques for implementing at least CIOS Central 102. In some examples, CIOS Central 102 can be the service that handles operations at the level of a "Flock." CIOS Central 102 has a few responsibilities, including but not limited to:

Serving as an authentication gateway for Flock metadata changes and release operations.

Storing an authoritative mapping of Flock metadata to the deployment artifacts and CIOS repositories for the flock.

Coordinating global Releases across Phases and Targets.

Synchronization to enforce policies like "no more than one ongoing release to a Flock at a time."

Detecting changes to Flock configuration (configuration) and artifacts, and triggering a release generation on such changes.

In some examples, a source code version-control management service (SCVMS) 104 can be configured to store authoritative Flock configuration and an artifact notification service (ANS) 106 can be subscribed to by CIOS Central 102, so that CIOS Central 102 can be informed of new artifact builds. The CIOS Central 102 can then map incoming changes against the affected flocks, and initiate release planning where desired. Additionally, in some examples, an artifact push service (APS) can be invoked by CIOS Central 102, before a release to a target, to ensure any artifacts required for a successful release are present in the target's region ahead of release.

In some examples, customers (e.g., engineers) 108 can call CIOS Central 102 to CRUD flocks and/or releases, and to view the status of ongoing CIOS activity. Flock management service 110 can include one or more API's to manipulate flocks, view/plan/approve service 112 can include CRUD API's to create and approve plans, and to view a central copy of the state of all CIOS-managed resources, change monitoring service 114 can watch SCVMS 104 for changes to flock configuration, and can receive notifications about changes to other artifacts from ANS 106, and state ingester service 116 can create copies of regional state in CIOS Central database (DB) 118 so that view/plan/approve 112 can expose them. In some examples, the CIOS Central DB 118 can be a DB of flocks, plans, and state. Flock information can be authoritative; while everything else may be a stale copy of data from CIOS Regional 120.

In some examples, engineer 108 can perform an API call for the flock management service 110 (e.g., through the ingress proxy fleet 122) to create a list of flocks. The protocol for making such an API call can be hypertext transport protocol secure (HTTPS) or the like. Relevant access control lists (ACLs) for this operation can include a local area network (LAN) 124 or other private connection. For example, CIOS may manage/control a network-connectivity alternative to using the public Internet for connecting a customer's on-premises data center or network with CIOS (e.g., a dedicated, leased, and/or private connection). Additionally, authentication and authorization (e.g., of the engineer 108) may be performed by a reservation system portal that allows users to manage machine infrastructure (e.g., reservation service). In some instances, CIOS Central 102 can store flock metadata, plans, and state in the Central DB 118, using Java database connectivity (JDBC) or the like. In some examples, ANS 106 can be configured to notify the change monitoring service 114 when new artifacts have been published. The ANS 106 may use HTTPS, and both authentication and authorization may be handled by a mutual transport layer security service. Additionally, in some instances, the change monitoring service 114 can poll the SCVMS 104 for flock configuration changes. This polling can be performed using secure shell (SSH) or other protocols. Authentication of the change monitoring service 114 may be handled by a CIOS system account and authorization may be handled by SCVMS 104.

In some examples, the engineer 108 can use the view/plan/approve service 112 to do one or more of the following operations. The engineer 108 can plan and/or approve by calling CIOS Central 102 to generate and approve plans. The engineer 108 can view by calling CIOS Central 102 to view the status of ongoing CIOS activity world-wide. Additionally, the engineer 108 can CIOS Central 102 to view a replica of the state of CIOS-managed resources world-wide. These API calls (or the like) can be performed via the HTTPS protocol or similar protocols. Additionally, relevant ACLs can be controlled by LAN 124, and both authentication and authorization can be handled by the reservation service. In some examples, the view/plan/approve service 112 can request planning and push plan approval to all regions of CIOS Regional 120 (e.g., using HTTPS or the like). Relevant ACLs can be controlled using a security list managed by the wide area network (WAN) gateway 126. Authentication can be handled by mutual transport layer security and authorization can be handled by various identity policies. Further, the state ingester service 116 can watch CIOS Regional 120 for job status or state changes, so that CIOS can provide a central view of them upon request (e.g., also using HTTPS or the like). ACLSs for this can also be handled by the WAN gateway 126, and both authentication and authorization can be handled by mutual transport layer security services.

Figure 2:
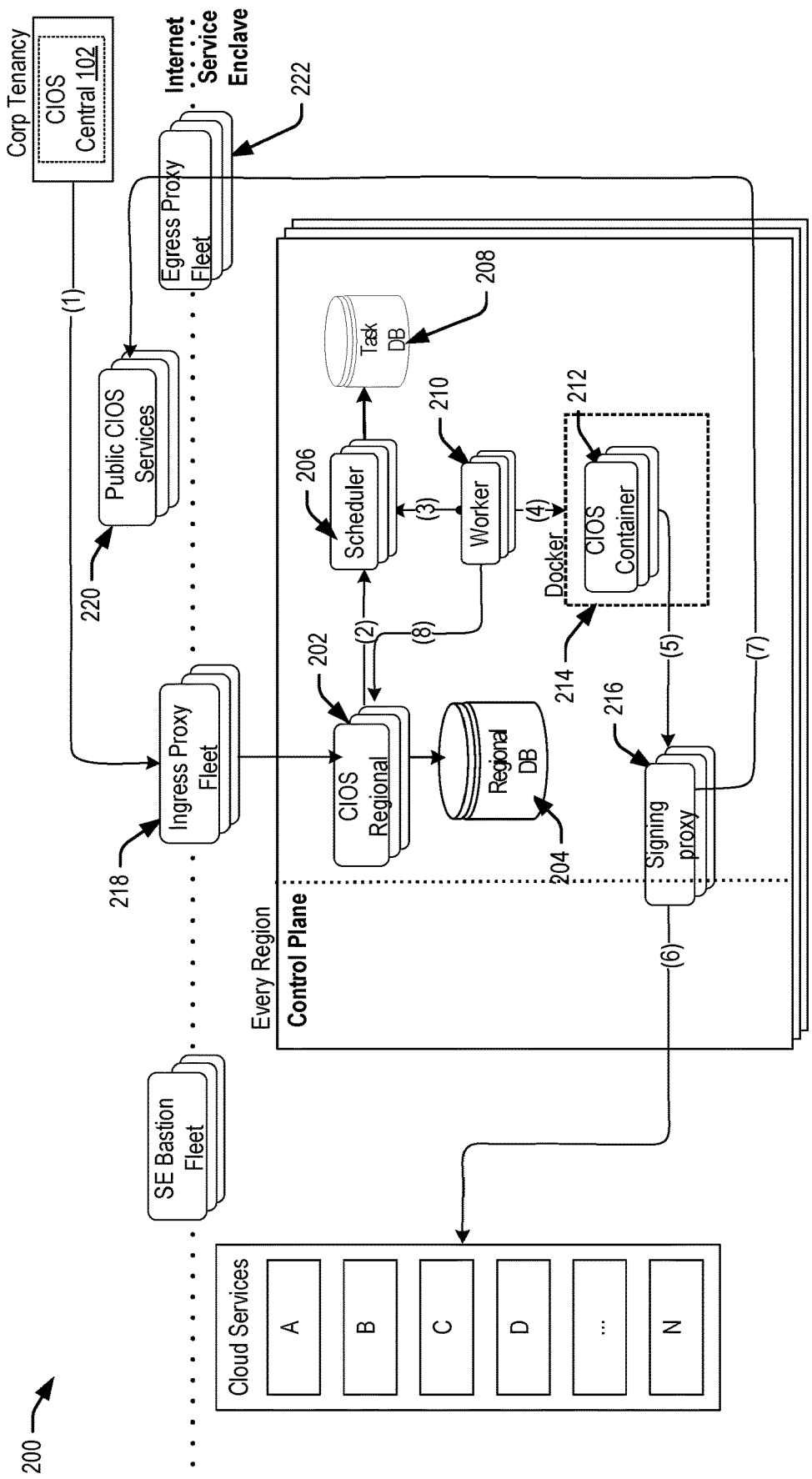
FIG. 2 is a block diagram of an architecture for implementing at least some elements of a cloud infrastructure orchestration service, according to at least one embodiment.

FIG. 2 depicts an architecture 200 for illustrating techniques for implementing at least CIOS Regional 120. In some examples, CIOS Regional 120 is where much of the work of declarative provisioning and planning, as well as approved release application can occur. In some instances, each instance of CIOS Regional 120 may have a CIOS regional front end that can handle operations at the level of "Execution Targets." It can be configured to perform the following:

Handling all CIOS Authentication for incoming operations from CIOS Central 102.
Enforcing a rule that only one "execution" (plan/import resources/apply plan) can be ongoing for a given Execution target at a time.
Managing binary artifact storage for declarative provisioning artifacts used for input and output during declarative infrastructure provisioning execution. Examples of input are declarative infrastructure provisioning configuration files and an input state file. Typical output is a final state file.
Requesting work from and polls for results from the CIOS Executor for any given execution.

In some instances, the CIOS regional Frontend may be dependent on an Executor 206 (also referred to herein as a "scheduler), which can handle the actual execution. The Executor, in some examples, operates at the level of "Execution," and it can:

Track a pool of available Worker nodes
Query incoming job requests, and assigns them to eligible workers as available
Track worker status and Execution updates for reporting to clients
Detect dead nodes via a leasing protocol, and can fail tasks assigned to dead nodes, depending on task status.
Provide facilities to cancel/kill/pause/resume Executions, and can map those onto facilities to pass cancellation/kill/resumption info on to Worker nodes.

In some instances, the CIOS Executor can depend on CIOS Workers, which can assign tasks for execution to Workers, and provide a facility for Workers to update job progress. The worker service operates at the granularity of "Task." Each worker is an agent executing Tasks assigned to that worker and reporting Task status and output. Each worker can:

Poll Executor Worker APIs for assigned work items, and take action to make the assign state match its local state:
start containers for polls task items that do not exist locally
kill containers for locally running containers that have no corresponding assigned task item
Report status for jobs
Stage input and output for job container execution
Launch and monitor declarative infrastructure provisioning containers for doing the real work of a Release for an Execution Target.

CIOS Workers may depend on CIOS Executor to poll work from and report results to the worker endpoint of the CIOS Executor. The Worker may rely on the Executor for all coordination. Additionally, the CIOS Workers may also depend on CIOS Regional 202, where the Worker services reads input from and writes output to one or more APIs that are associated with the Regional Frontend service. Examples of input are configuration and starting state files and import mappings. Examples of output are declarative provisioning process, output declarative provisioning state files, and import result states.

In some examples, CIOS Regional 202 can be a regional service for managing regional instances/deployments of CIOS. CIOS Regional 202 covers responsibility for authoritatively storing and managing plans and stat that pertains to a particular region. A Regional DB 204 may be a CIOS DB for the state and plans in the particular region. This is the authoritative copy of the region's subset of the Central DB 118 of FIG. 1. Scheduler 206 can be responsible for managing worker fleet capacity, assigning tasks to workers, and keeping track of task state. In some instances, Task DB 208 is another CIOS DB for task state. Data in this DB is mostly for operational purposes. Additionally, Worker 210 can be a fleet of java virtual machines (JVMs) that manage declarative provisioning images. These receive instructions from the Scheduler 206 and communicate results to both the Scheduler 206 and CIOS Regional 202. A CIOS container 212 can run declarative provisioning actions in its own private docker 214 container. This container does not need to contain secrets. Additionally, in some examples, a signing proxy 216 can be configured to prevent secret exfiltration via a declarative provisioning tool, in order to avoid putting secrets in the declarative provisioning Image. Instead, CIOS can perform request signing or initiate a mutual transport layer security (mTLS) service in a proxy. This also makes it easier to use FIPS-compliant crypto libraries.

In some examples, CIOS Central 102 can call CIOS Regional 202 to create plans, push approvals, watch job status (service principal), and extract declarative provisioner state (service principal). An ingress proxy 218 can be configured as the ACL and various identity policies may be used for both authentication and authorization. Alternatively, in some examples, the ingress proxy 218 may be replaced with a load balancer configured to balance the load incoming requests, plans, etc. In some instances, CIOS Regional 202 may run a declarative provisioner by asking the scheduler 206 to do so. Worker 210 can ask Scheduler 206 what it should be running, and can report status to Scheduler 206 when done. In some cases, mTLS may handle both authentication and authorization for CIOS Regional 202 and Worker 210. Additionally, when Worker 210 needs to run a declarative provisioner, it does so in docker containers by interacting with the local docker 214. Authentication for this stage may be handled by a local unix socket. A docker protocol may be used for this last step; however, HTTPS may be utilized for the previous ones.

In some examples, the CIOS container 212 enables a declarative provisioner to interact (via API) with the signing proxy 216, while the declarative provisioner thinks it's calling various CIOS services. The signing proxy 216 listens on one ephemeral port per calling instance of declarative provisioner, known only to that declarative provisioner. The signing proxy 216 can initiate requests signatures or mTLS, and can pass the declarative provisioner's calls through to other CIOS services within the service enclave. In some instances, the signing proxy 216 can also communicate with one or more public CIOS services 220. For example, the Signing Proxy 216 will use the internal endpoint of public services where possible. For services with no internal endpoint, it must use the egress proxy 222 to reach the external endpoint. This use of the signing proxy 216 may not be for cross-region communication; for example, an egress proxy whitelist in each region may only be for that region's public IP ranges. In some examples, Worker 210 may then persist state and logs from a declarative provisioner in CIOS Regional 202 so that they can be exfiltrated to CIOS Central 102.

Using CIOS, there are a few phases of a representative customer experience: onboarding, pre-release, world-wide release, and tactical release. For the pre-release phase, the below is an example of what happens between a new artifact being built and releasing artifacts to release one (e.g., R1). This should replace some or most of current change management processes. As relevant artifacts are built, CIOS can automatically generate releases using "the latest version of everything in the flock." A release is a specific version of the flock config with specific inputs (e.g. artifact versions, realm, region, and ad). A release contains one roll-forward plan per region and metadata describing region ordering. Each regional plan is the set of operations a declarative provisioner would take to realize the flock configuration in that region. Teams with pre-release environments can use CIOS to automatically release and test software in said environments. Teams can configure CIOS to automatically test the roll-back plan. Teams will be able to inspect and approve releases through the CIOS UI. Teams can approve some but not all of the regional plans within a release. If "the latest version of everything" yielded no suitable plans, teams can ask CIOS to generate a plan for cherry-picked artifact versions.

For the world-wide release phase, the below is an example of how a team executes tomorrow's version of today's "normal CM." Once a release is approved, CIOS pushes each approved regional plan to the respective region. CIOS acts independently within each region to apply approved plans. CIOS will only perform the set of actions explicitly described in that region's plan. Instead of "thinking independently," it will fail. CIOS UI shows teams the progress of the execution. CIOS UI prompts teams when manual approvals are required. If execution fails because of an outage in CIOS or in a downstream service, CIOS can notify the team and can prompt them for next steps (e.g., abort, retry). CIOS does perform retries, but some downstream system outages will exceed its willingness to retry. If execution fails because of service health degradation or a test failure, CIOS will assist teams with rolling the flock back to its starting state. CIOS will notify (e.g., page) teams when it initiates automatic rollback. Teams must approve the rollback plan, then CIOS will execute it.

For the tactical release phase, the below is an example of how a team can execute tomorrow's version of an "emergent CM." When generating a plan, teams may ask CIOS to target the plan at specific resources in several ways: topologically (e.g., realm, region, AD, etc.), by resource type (e.g., "only metrics configs" or "only deployment orchestration service deployments", etc), or combinations of the above (e.g., in a disjunctive manner). Teams approve tactical releases just like world-wide releases. CIOS orchestrates them similarly. If a team needs to deploy a tactical release while there is an active a world-wide release, CIOS will stop executing the world-wide release in the targeted regions, then start executing the tactical release.

In some examples, a declarative provisioner's state (e.g., traditionally a file) is an authoritative record of the set of resources managed by the declarative provisioner. It contains the mapping between the logical identifier of each resource from the configuration file and the actual identifier of the resource. When the declarative provisioner is creating a resource, certain kinds of failure can prevent the actual identifier from being recorded in the state. When this happens, the actual identifier is lost to the declarative provisioner. These can be called "orphaned resources."

For most resources, orphans represent waste—the declarative provisioner launched (for example) an instance that it forgot about, but will launch another instance instead the next time it is run. For resources with uniqueness constraints or client-supplied identifiers, orphans prevent the declarative provisioner from making forward progress. For example, if the declarative provisioner creates a user 'nglass' and a failure orphans it, the next run of the declarative provisioner will attempt to create 'nglass' and fail because a user with that username already exists. In some cases, orphans are only a problem when adding new resources to the state. In some instances, the declarative provisioner's refresh behavior may naturally recover from failures to record updates and deletions.

CIOS needs to be robust in the event of downstream service outages or outages of CIOS itself. Because CIOS can leverage a declarative provisioner to apply changes, this means there should be robustness around running the declarative provisioner and maintaining the declarative provisioner state. The declarative provisioner providers perform 'small scale' retries—enough to avoid outages lasting for small numbers of minutes. For example, a cloud provider will retry for up to 30 minutes. Downstream system outages lasting longer than 30 minutes will cause the declarative provisioner to fail. When the declarative provisioner fails, it records all changes it successfully made in the state, then exits. To retry, CIOS must re-execute the declarative provisioner. Re-executing the declarative provisioner also allows CIOS to retry in the event of a failure in CIOS itself. In some instances, CIOS can run the following operations in a loop:

Refresh—the declarative provisioner calls GET APIs to retrieve a fresh snapshot of every resource described in its state.

Plan—the declarative provisioner generates a plan (a concrete set of API calls) that will realize the desired state, given the recently-refreshed current state.

Apply—the declarative provisioner executes the set of steps in the plan.

CIOS may always run all three of these steps when executing the declarative provisioner. The refresh operation helps recover from any updates or deletions that weren't recorded. CIOS inspects the result of the plan operation and compares it to the approved release plan. If the newly generated plan contains operations that were not in the approved release plan, CIOS may fail and may notify the service team.

Figure 3:
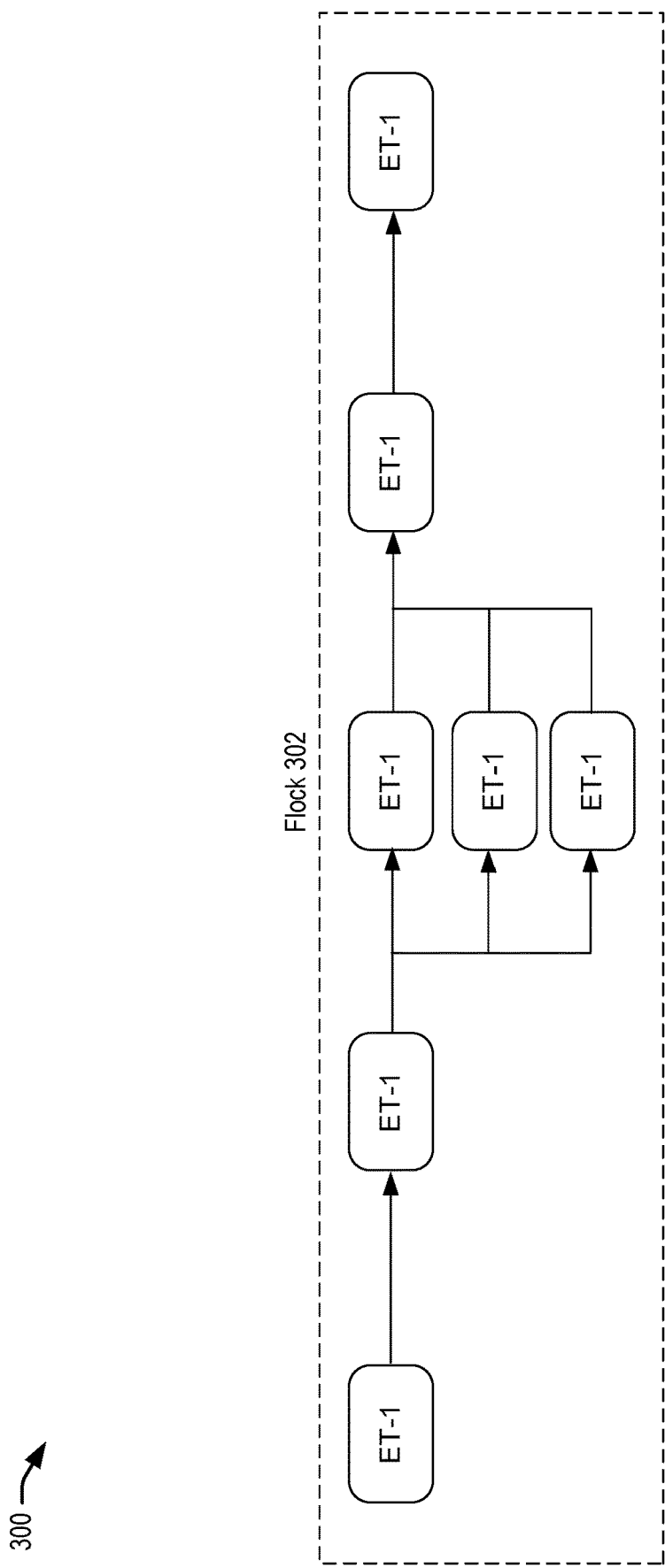
FIG. 3 is a flow diagram for illustrating an example flock, according to at least one embodiment.

FIG. 3 depicts a directed acyclic graph (DAG) 300 for illustrating an example flock 302. The progression of code/config from check-in to production, for a single flock config in CIOS, can be described all the way from the first testing deployment to the last prod deployment. Internally, CIOS calls each element in the progression an ExecutionTarget (ET)—this is all over our internal APIs, but does not leak out in to the flock config. CIOS executes ETs based at least in part on the DAG 200 defined in the flock config. Each ET (e.g., ET-1, ET-2, ET-3, ET-4, ET-5, ET-6, and ET-7) is, roughly, one copy of the service described by the flock config.

Figure 4:
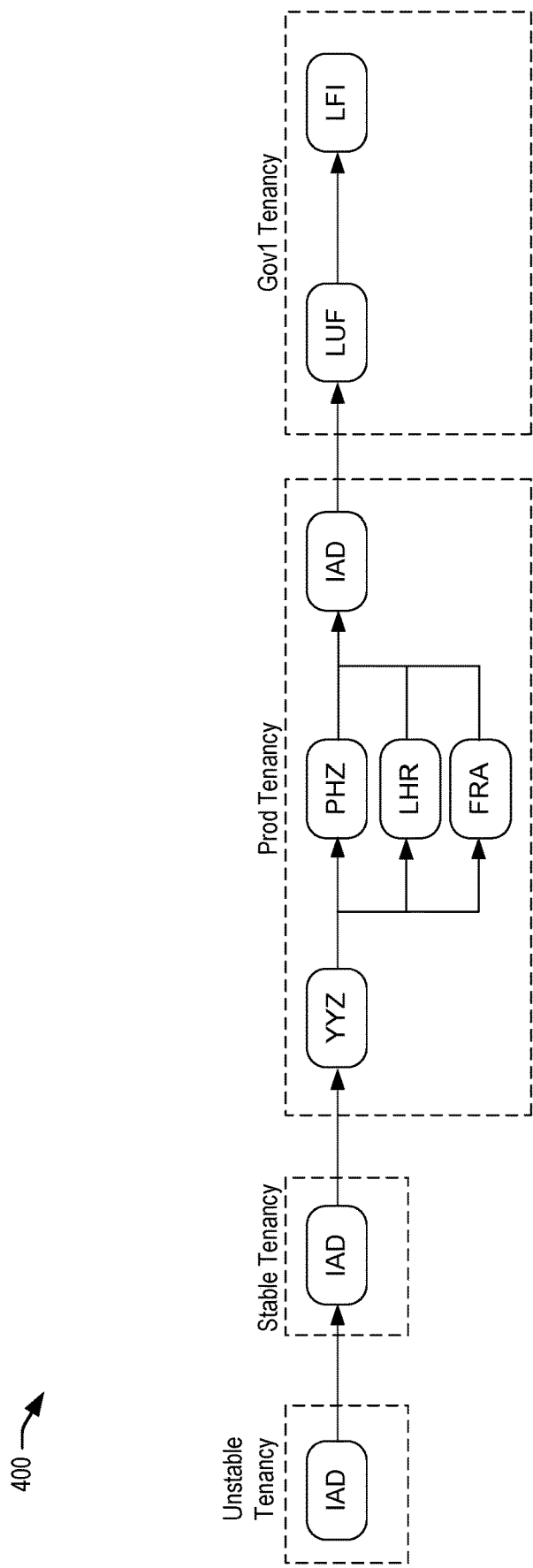
FIG. 4 is a flow diagram for illustrating an example flock, according to at least one embodiment.

FIG. 4 depicts a DAG 400 for illustrating and example flock 402. In the flock config, CIOS is very opinionated about how teams express this progression—they must model it using cloud infrastructure tenancies and regions. Teams should not model progression using realms. CIOS allows teams to use many tenancies within a realm and many regions within a tenancy. However, CIOS does not allow teams to use the same region twice within a tenancy (though they may use the same region twice within a realm—in different tenancies). DAG 400 illustrates a version of DAG 300 from FIG. 3, expressed with tenancies and regions. This example is for an overlay service, where pre-prod ETs are in a prod region. A service enclave service would have the unstable and stable tenancies in release one. In DAG 400, IAD is a regional airport code for Dulles airport in Washington, D.C., YYZ is a regional airport code for Toronto, Ontario, PHX, LHR, and FRA, are regional airport codes for Phoenix, London, and Frankfurt, respectively, and LUF and LFI are for two different air force bases.

In one embodiment, CIOS and/or other techniques described herein are an improvement on each of Terraform (a declarative provisioning tool), Tanden, and the Oracle Deployment Orchestrator (ODO). Additionally, in some examples, CIOS and/or other techniques described herein can be implemented using at least portions of the Terraform, Tanden, and ODO tools.

In certain embodiments, the CIOS described herein discloses techniques for rolling back infrastructure changes associated with infrastructure assets provisioned and/or deployed by CIOS. The infrastructure assets may include infrastructure resources such as, for instance, virtual private clouds, virtual machines, load balancers, databases, deployment configurations, infrastructure code, software applications and the like. In certain embodiments, the CIOS implements a rollback procedure for rolling back (i.e., restoring) a set of infrastructure assets to a previous state from a failure that occurs at any point during the provisioning and/or deployment process. Existing declarative provisioning tools (e.g., Terraform) do not have the ability to automatically handle rollback operations when a failure occurs during a provisioning and/or deployment process because these tools generally cannot keep track of previous configurations that were used previously to achieve a state prior to the current state. Since a rollback operation partially consists of applying a previous configuration, existing provisioning tools cannot perform rollbacks because they don't have access to any previous configurations. In other words, existing declarative provisioning tools are stateless with respect to previous invocations. They can keep track of a current view of the state of the resources they manage, but cannot keep track of a history of actions that led to that state.

One technical improvement realized by the techniques described herein is the ability to provide a CIOS system with the ability to automatically handle rollbacks that existing declarative infrastructure provisioning tools are not designed to handle. The CIOS system described herein is capable of capturing a full history of configurations, so that prior configurations are available to be rolled back to. The CIOS system is capable of keeping track of a lineage of configurations, so that it can identify and access those configurations and use them again. The CIOS system keeps track of invocations (actions) including whether they are successful or not, so CIOS can, as a "best guess", select the last successfully used configuration as the one to roll back to.

Additionally, existing provisioning tools often require a user to provide inputs to a configuration to bind to the variables in the configuration. These tools generally cannot capture these inputs beyond using them to generate a plan that informs the tool about the changes it will make. Therefore, these tools cannot accurately replay configurations to try to get back to a previously good known state because they are not aware of what values to bind to those variables. The disclosed CIOS system, in addition to a history of invocations, can also keep track of those variable inputs, so that in addition to using a previous configuration to try to roll back to a known good state, it can use the same variables to achieve that state.

In certain examples, CIOS implements a rollback plan for rolling back (i.e., restoring or reverting) a set of infrastructure assets defined in a plan to a previous state from a failure that occurs at any point during the provisioning and/or deployment process. In one example, CIOS implements a "rollback plan" for rolling back a provisioned set of infrastructure resources defined in a plan. In other examples, CIOS implements a "rollback plan" for rolling back a set of software artifacts (e.g., applications, infrastructure code) deployed on a set of provisioned infrastructure resources. The rollback plan implements a "rollback operation" to roll back the plan to a previous version that identifies a first state of the set of infrastructure assets defined in the plan prior to the execution of the plan. In certain examples, CIOS transmits a result associated with the execution of the rollback plan to a user of the CIOS. The result is indicative of a successful or failed execution of the rollback plan and is displayed via a user interface of the CIOS to the user.

Figure 5:
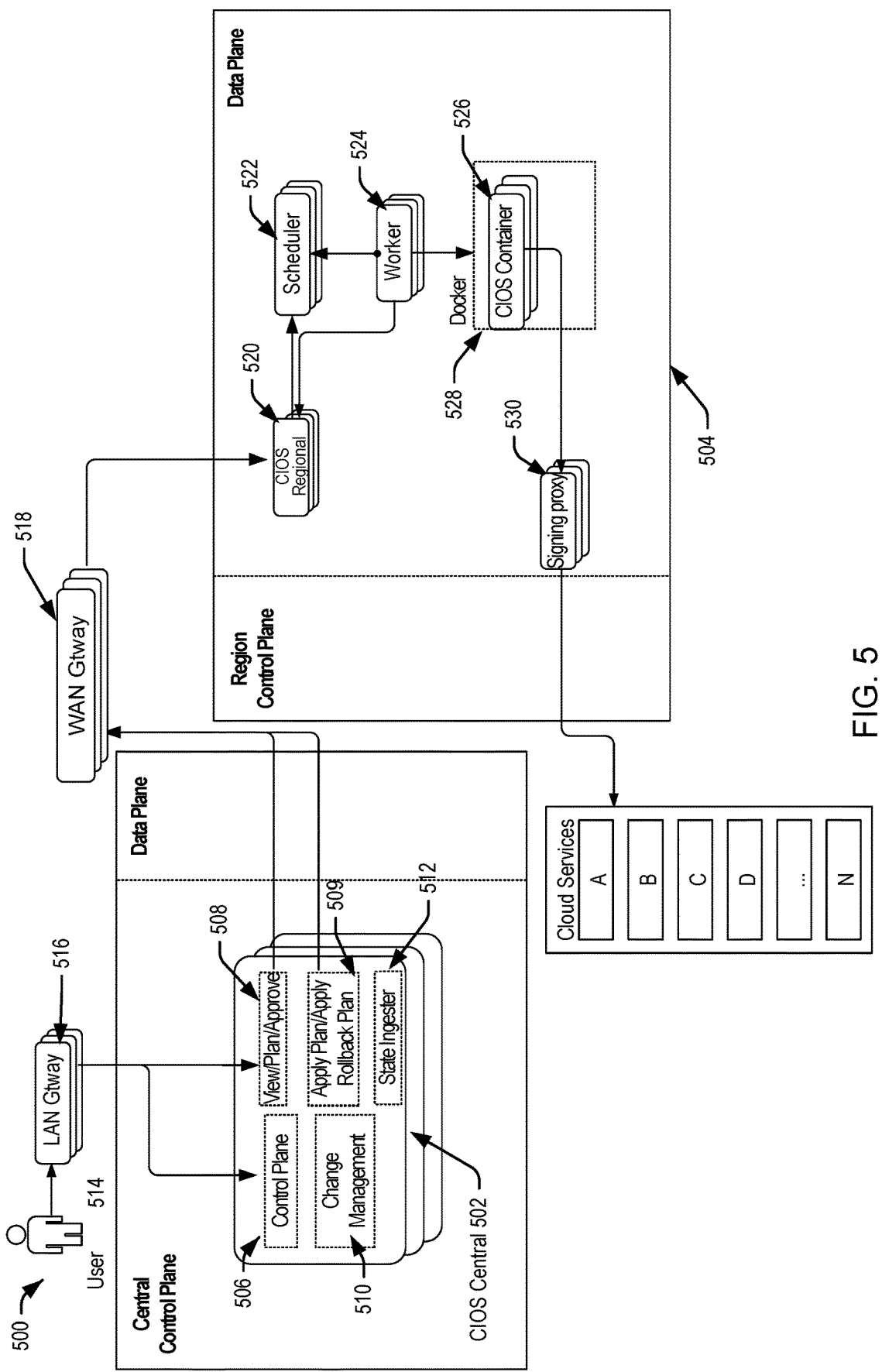
FIG. 5 depicts a combination block diagram of an architecture for implementing at least some elements of a cloud infrastructure orchestration service, according to at least one embodiment.

FIG. 5 depicts a block diagram 500 of an architecture for implementing at least some elements of the CIOS, according to at least one embodiment. The block diagram 500 shows at least portions of both a CIOS central 502 (e.g., CIOS central 102 of FIG. 1) and a CIOS region 504. The CIOS central 502 can include a control plane 506 (e.g., the control plane 110 of FIG. 1), a view/plan/approve service 508 (e.g., the view/plan/approve service 112 of FIG. 1), a change management service 510 (e.g., the change management service 114 of FIG. 1), a state ingester service 512 (e.g., the state ingester service 116 of FIG. 1) and an apply plan/apply rollback plan service 509.

In certain embodiments, a user 514 may submit a "plan creation request" to the CIOS Central 502. The "plan creation request" may include a configuration file that declaratively describes the configuration of a set of infrastructure assets (also referred to herein as "infrastructure elements") to be created (e.g., provisioned) and/or deployed to one or more execution targets. An execution target as described herein may be associated with a region that comprises at least one physical location. The infrastructure assets may include, without limitation, infrastructure resources such as virtual private clouds (VPCs) (e.g., a potentially on-demand pool of configurable and/or shared computing resources), security group rules (that define how the security of the network will be set up), virtual machines (VMs), load balancers, databases, deployment configurations and so on and software artifacts (e.g., applications, infrastructure code) that are deployed on the infrastructure resources. In certain examples, the configuration file may describe how the infrastructure assets interact with one another and the relevant fields needed to create each infrastructure asset. For instance, the configuration file may describe a VPC resource and the fields required to create the VPC resource. As the infrastructure incrementally evolves, the user may update the configuration file to add new infrastructure elements and also reference the new elements with previously described elements in the infrastructure.

The view/plan/approve service 508 in the CIOS Central 502 receives the "plan creation request" from user 514 (via LAN gateway 516) and creates a "plan" based at least in part on the set of infrastructure assets defined in the configuration file. In certain examples, the plan may be scoped to "provision a set of infrastructure resources" to a region or to a subset of regions managed by the CIOS Central 502 and is referred to herein as an "infrastructure release plan." In other examples, the plan may be scoped to "deploy a set of software artifacts (i.e., applications)" to a region or to a subset of regions managed by the CIOS Central 502 and is referred to herein as an "application release plan." In some examples, an application release plan can include a first set of declarative instructions for provisioning a set of infrastructure resources to an execution target or a second set of declarative instructions for deploying a set of software artifacts (i.e., applications) on the set of provisioned infrastructure resources to the execution target.

Once a plan has been created and/or generated as described above, the user 514 can approve the plan. The CIOS Central 502 then submits the approved plan to the apply plan/apply rollback plan service 509 which comprises instructions for executing the plan and executing a roll back plan for the plan. The apply plan/apply rollback plan service 509 transmits the approved plan to the CIOS Regional 504 (e.g., CIOS regional 202 of FIG. 2), for execution via WAN gateway 518 (e.g., the WAN gateway 126 of FIG. 1). In certain examples, the execution of the plan by CIOS Regional 504 may involve receiving a trigger from CIOS Central 502 to initiate and execute a rollback plan to restore the set of infrastructure assets defined in the plan to their original state. Details related to processing performed by the CIOS Regional 504 for executing a rollback plan are described below with respect to the flowcharts depicted in FIGS. 6-8 and the accompanying description.

In certain embodiments, the CIOS regional 520 can be a computing device that generates status reports and keeps track of tasks coming into the CIOS region 504. The CIOS regional 520 can transmit tasks from a plan to a scheduler 522 (e.g., the scheduler 206 of FIG. 2), which can be a computing device that can assign tasks to a worker 524 (e.g., the worker 210 of FIG. 2), typically to a worker with the least amount of work. In some embodiments, the CIOS regional 520 and the scheduler 522 can be on the same computing device. The worker 524 can be a computing device that can execute tasks assigned by the scheduler 522, as well as plugins, and the worker 524 may be part of a worker fleet, which can include many workers 524. The worker 524 can interact with a CIOS container 526 (e.g., CIOS container 212 of FIG. 2), which can exist within a docker 528 (e.g., the docker 214 of FIG. 2). CIOS container 526 can check for a difference in a desired state of an execution target compared to an actual state of the execution target related to the task assigned to the worker 524. If CIOS container 526 identifies the difference, the worker 524 may execute the task, and if CIOS container 526 does not identify the difference, the worker 524 may not execute the task. By executing the task, an API call to cloud services can be made, and the API call may go through a signing proxy 530 (e.g., the signing proxy 216 of FIG. 2). The signing proxy 530 can be a generic HTTP proxy, and the signing proxy 530 can control outgoing network traffic of the CIOS region 504.

Figure 6:
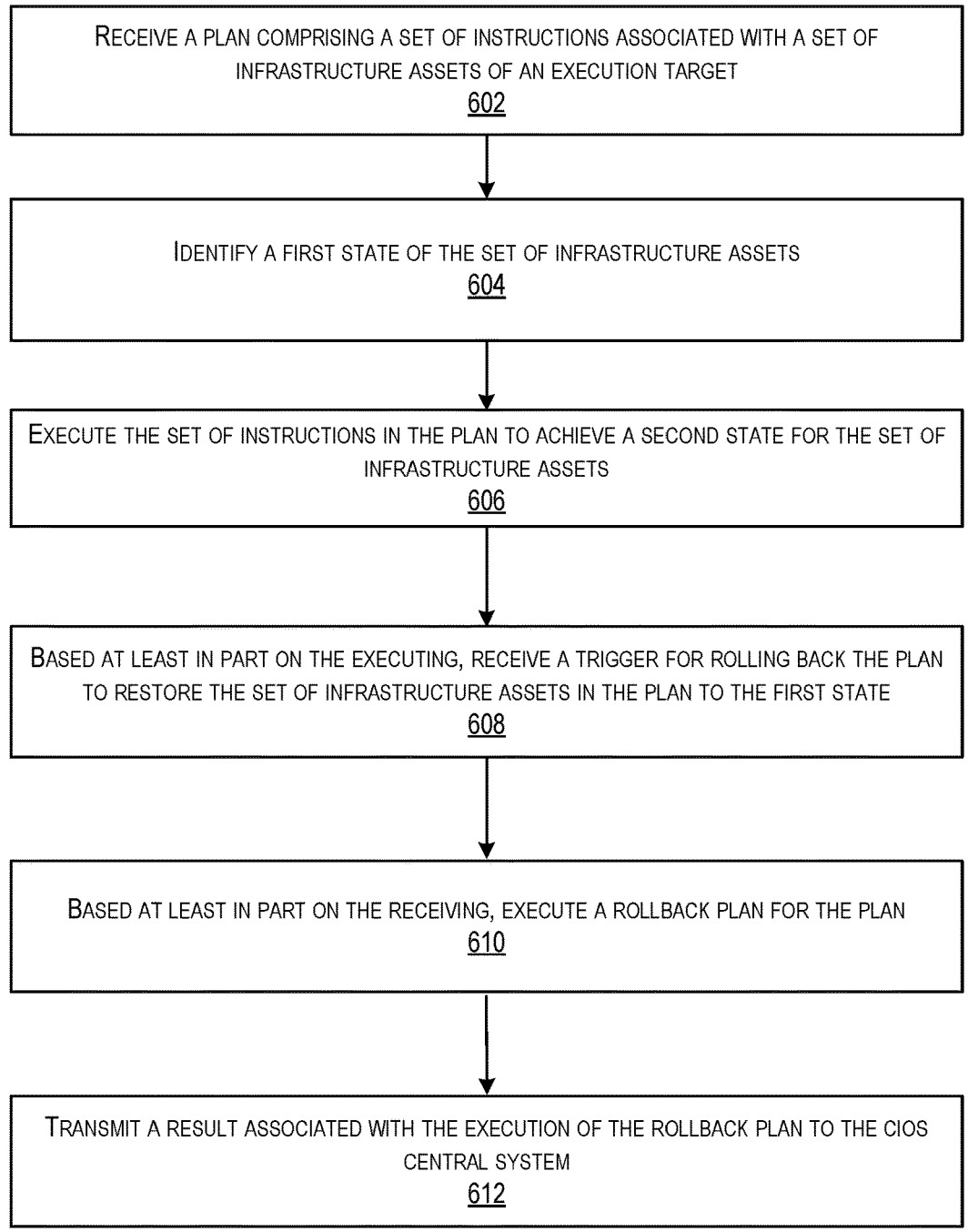
FIG. 6 depicts an example of a process for executing a rollback plan for a plan based at least in part on receiving a trigger, according to certain embodiments.

FIG. 6 depicts an example of a process 600 for executing a rollback plan based at least in part on receiving a trigger, according to certain embodiments. The processing depicted in FIG. 6 may be implemented in software (e.g., code, instructions, program) executed by one or more processing units (e.g., processors, cores) of the respective systems, hardware, or combinations thereof. The software may be stored on a non-transitory storage medium (e.g., on a memory device). The process 600 presented in FIG. 6 and described below is intended to be illustrative and non-limiting. Although FIG. 6 depicts the various processing steps occurring in a particular sequence or order, this is not intended to be limiting. In certain alternative embodiments, the steps may be performed in some different order or some steps may also be performed in parallel. In certain embodiments, such as in the embodiment depicted in FIG. 5, the processing depicted in FIG. 6 may be performed by CIOS Regional 504.

In certain embodiments, processing is initiated at block 602 when CIOS Regional 504 receives a plan comprising a set of instructions associated with a set of infrastructure assets of an execution target. In certain examples, the set of instructions comprise declarative instructions that declaratively describe the configuration of the set of infrastructure assets and the manner in which the assets interact with one another.

At block 604, CIOS Regional 504 identifies a first state of the set of infrastructure assets. For example, the first state may correspond to an initial state of a set of infrastructure resources defined in the plan prior to execution of the plan.

At block 606, CIOS Regional 504 executes the set of instructions in the plan to achieve a second state for the set of infrastructure assets. For example, the second state may corresponds to a state of a set of infrastructure resources in the plan after execution of the plan.

At block 608, based at least in part on the executing performed in block 606, CIOS Regional 504 receives a trigger (from CIOS Central 502) for rolling back the plan to restore the set of infrastructure assets in the plan to the first state. In some instances, a trigger identifies a configuration parameter in the configuration file of the plan that indicates that the plan is being executed in a pre-production test environment. Based at least in part on the identification of the configuration parameter, CIOS Central 502 transmits instructions to CIOS Regional 504 to automatically execute a rollback plan for the plan to determine if the infrastructure assets can be safely rolled back. In other instances, a trigger may involve the identification (by CIOS Central 502) of an "error" (failure) in the execution of the plan in an actual production environment which causes a rollback plan for the plan to be executed. By way of example, an error may be detected during the provisioning of an infrastructure resource or during the deployment of a software artifact. For instance, the error may be caused as a result of an update to the configuration of an infrastructure resource that is made by the user during the provisioning process which causes the rollback plan to be executed. Details related to the processing performed by CIOS Regional 504 based at least in part on receiving a trigger from CIOS Central 502 for rolling back a plan are described below with respect to the flowcharts depicted in FIGS. 7 and 8 and the accompanying description.

At block 610, based at least in part on receiving the trigger in block 608, CIOS Regional 504 executes the rollback plan for the plan.

Figure 9:
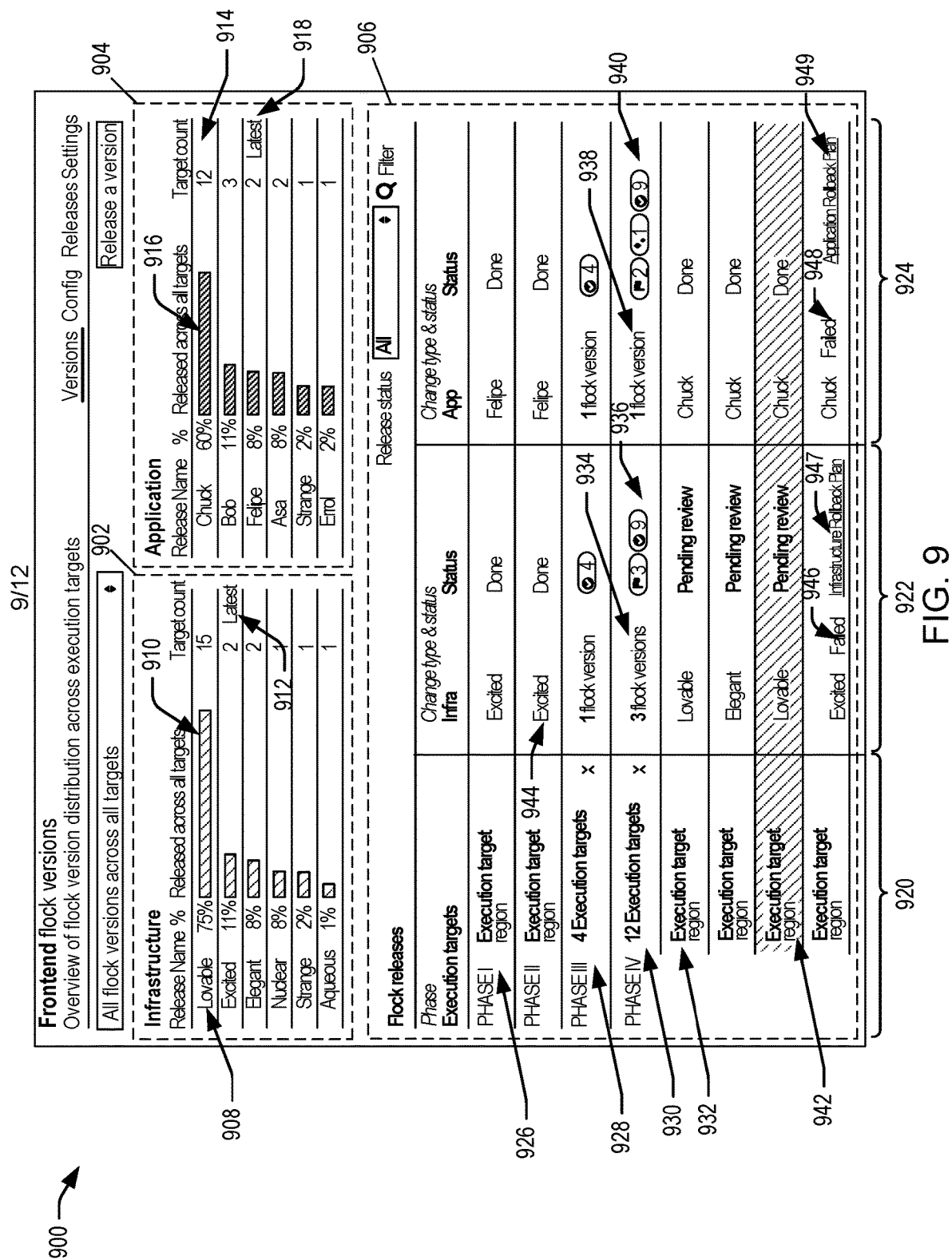
FIG. 9 depicts a schematic diagram of an example user interface (UI), according to at least one embodiment.

At block 612, CIOS Regional 504 transmits a result associated with the execution of the rollback plan to CIOS Central 502. In certain embodiments, and as shown in FIG. 9, a user interface (UI) 900 may be presented to a user (e.g., user 514 in FIG. 1) by CIOS Central 502 to display the result associated with the execution of the rollback plan. The result may indicate a successful or a failed execution of the rollback plan to the user.

Figure 7:
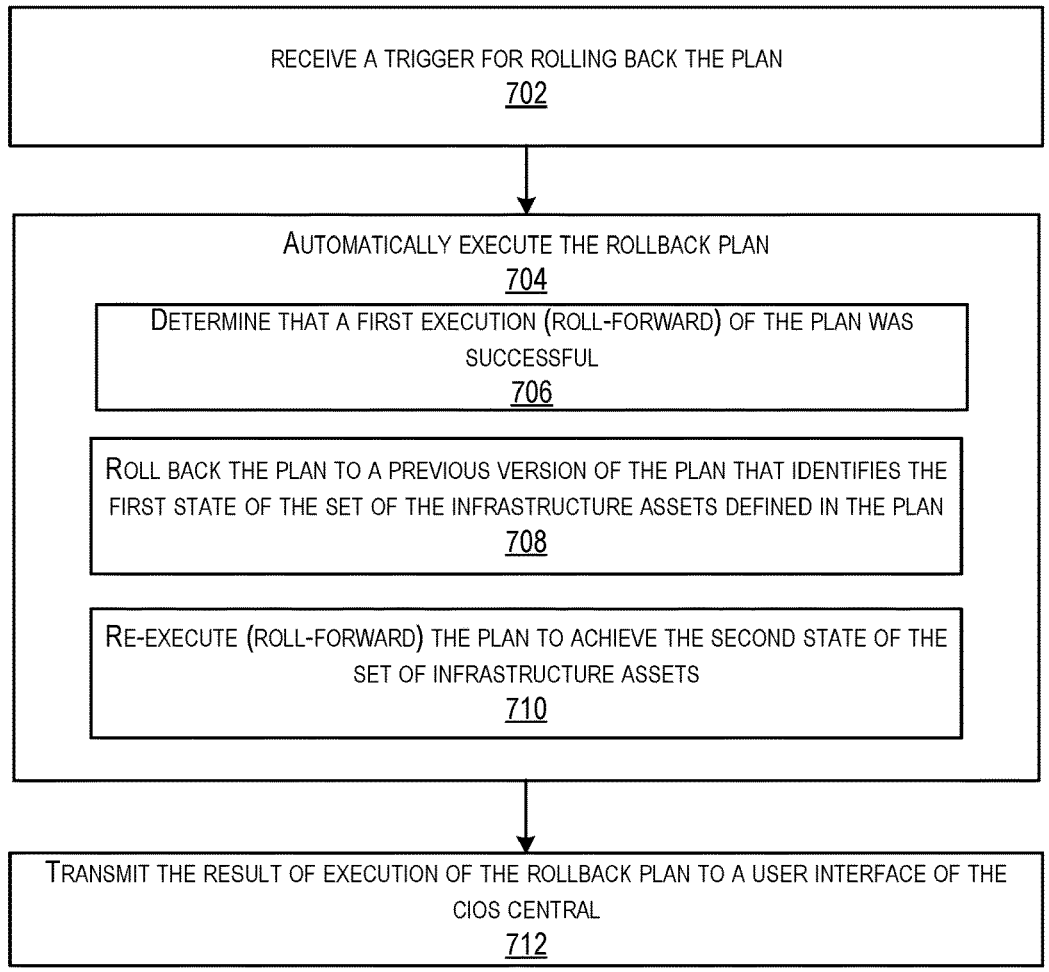
FIG. 7 depicts an example of a process for receiving a trigger that causes an execution of a rollback plan for a plan executed in a pre-production test environment, according to certain embodiments.

FIG. 7 depicts an example of a process 700 for receiving a trigger that causes an execution of a rollback plan for a plan executed in a pre-production test environment, according to certain embodiments. The processing depicted in FIG. 7 may be implemented in software (e.g., code, instructions, program) executed by one or more processing units (e.g., processors, cores) of the respective systems, hardware, or combinations thereof. The software may be stored on a non-transitory storage medium (e.g., on a memory device). The process 700 presented in FIG. 7 and described below is intended to be illustrative and non-limiting. Although FIG. 7 depicts the various processing steps occurring in a particular sequence or order, this is not intended to be limiting. In certain alternative embodiments, the steps may be performed in some different order or some steps may also be performed in parallel.

In certain embodiments, the processing depicted in FIG. 7 is initiated at block 702 when CIOS Regional 504 receives a trigger from CIOS Central 502 for rolling back the plan (as a result of the processing performed in block 608). As previously described, in some instances, the trigger identifies a configuration parameter in the configuration file that indicates that that the plan is being executed in a pre-production test environment and that a rollback plan for the plan should be tested (i.e., executed) to rollback (i.e., revert) the plan to its previous (first) state that existed prior to the execution of the plan. Based at least in part on the identification of the configuration parameter, CIOS Central 502 transmits instructions to CIOS Regional 504 to automatically execute a rollback plan for the plan to determine if the infrastructure assets can be safely rolled back. In certain examples, the configuration parameter is a "practice rollback flag" parameter that is "marked" or "set" in the configuration file that indicates to CIOS Regional 504 that the plan is being executed in a pre-production configuration environment, i.e., prior to its implementation in an actual production environment. When CIOS Regional 504 sees that the "practice rollback flag" configuration parameter is "marked" or "set" in the configuration file, it automatically executes a rollback plan to determine if the plan can be safely "rolled back" or "reverted" to a previous version that existed prior to the execution of the plan.

At block 704, CIOS Regional 504 tests the rollback plan by automatically executing the rollback plan. In certain examples, testing the rollback plan includes performing the following operations:

(1) Determining (at block 706) that a first roll forward (i.e., first execution of the plan) was successful.

(2) Performing a rollback operation (at block 708) that rolls back (i.e., reverts) the plan to a previous version that identifies the first state of the set of infrastructure assets defined in the plan prior to the first execution of the plan; and (3) Performing a second roll-forward operation (at block 710) that re-executes the plan to achieve the second state of the set of infrastructure assets.

As noted above, in certain examples, the plan may be an "infrastructure release plan" that is scoped to "provision a set of infrastructure resources" to a region or to a subset of regions managed by CIOS Central 502. In this case, testing a rollback plan for the "infrastructure release plan" (e.g., at block 704) may involve determining if a provisioned set of infrastructure resources can be safely and successfully rolled back to a previous version of the "infrastructure release plan" followed by a successful re-execution of the plan to achieve the second state of the set of infrastructure resources (i.e., the provisioned set of infrastructure resources). In other examples, the plan may be an "application release plan" that is scoped to "deploy a set of software artifacts (i.e., applications)" to a region or to a subset of regions managed by CIOS Central 502. In this case, testing a rollback plan for the "application release plan" (e.g., at block 704) may involve determining if a deployed set of software artifacts can be safely and successfully rolled back to a previous version of the "application release plan" followed by a successful re-execution of the plan.

At block 710, CIOS Regional 504 transmits a result associated with the execution of the rollback plan to CIOS Central 502. In certain embodiments, and as shown in FIG. 9, a user interface (UI) 900 may be presented to a user (e.g., user 514 in FIG. 1) by CIOS Central 502 to display the result associated with the execution of the rollback plan. The result may indicate a successful or a failed execution of the rollback plan to the user.

Figure 8:
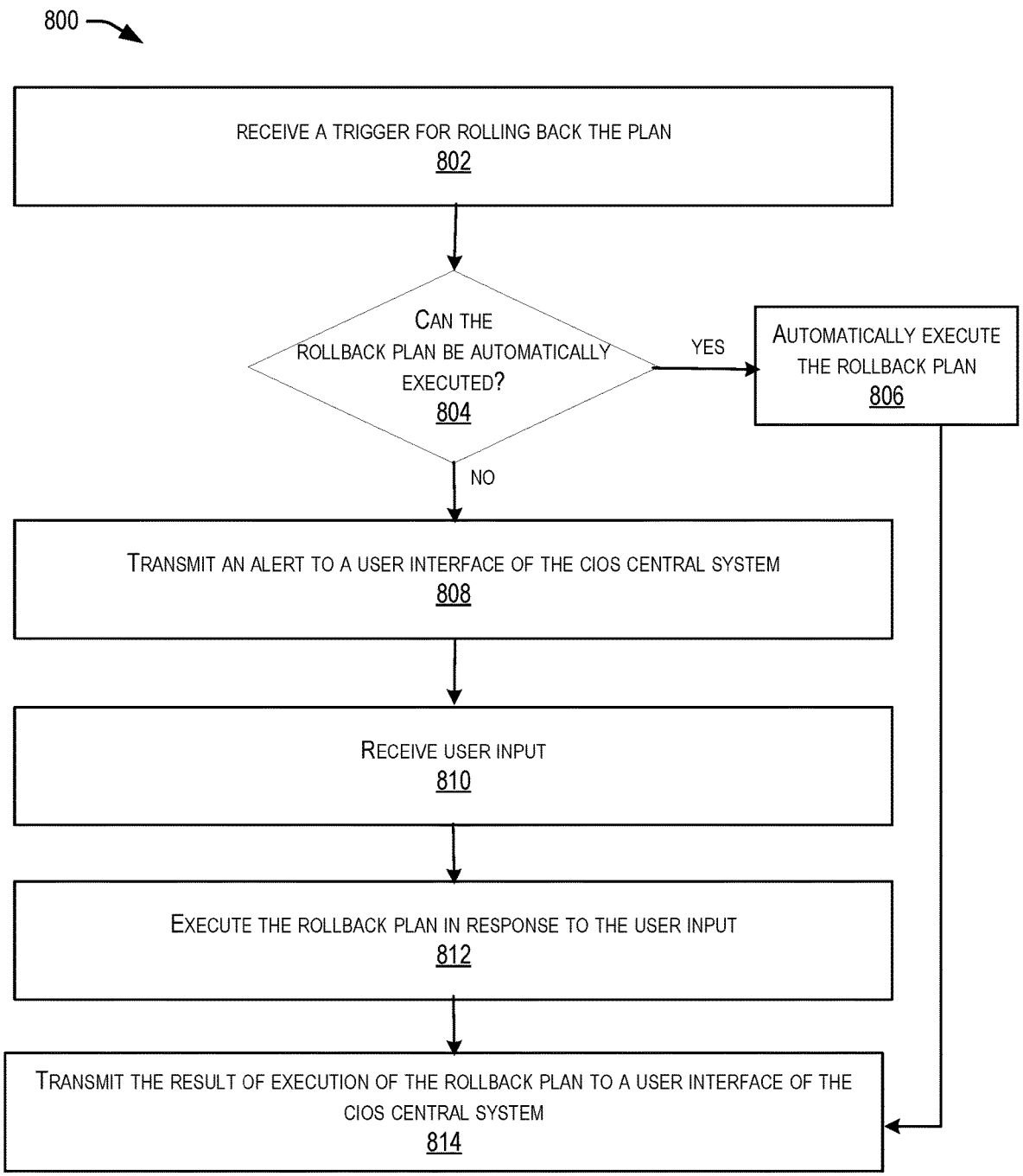
FIG. 8 depicts an example of a process for receiving a trigger that causes an execution of a rollback plan of a plan executed in an actual production environment, according to certain embodiments.

FIG. 8 depicts an example of a process 800 for detecting a trigger that causes an execution of a rollback plan of a plan executed in an actual production environment, according to certain embodiments. The processing depicted in FIG. 8 may be implemented in software (e.g., code, instructions, program) executed by one or more processing units (e.g., processors, cores) of the respective systems, hardware, or combinations thereof. The software may be stored on a non-transitory storage medium (e.g., on a memory device). The process 800 presented in FIG. 8 and described below is intended to be illustrative and non-limiting. Although FIG. 8 depicts the various processing steps occurring in a particular sequence or order, this is not intended to be limiting. In certain alternative embodiments, the steps may be performed in some different order or some steps may also be performed in parallel.

In certain embodiments, the processing depicted in FIG. 8 is initiated at block 802 when CIOS Regional 504 receives a trigger for rolling back the plan (as a result of the processing performed in block 608). In this embodiment, the trigger identifies an "error" that is detected by CIOS Central 502 during the execution of the plan (e.g., during provisioning of an infrastructure resource at the execution target or during deployment of a software artifact at the execution target). As an example, the error may occur as a result of an update made by a user 514 to the configuration of an infrastructure resource during execution of the plan. For instance, the user may update a configuration of an infrastructure resource (e.g., a load balancer) in the configuration file of a plan which in turn may cause a failure of the execution of the plan while the declarative provisioner is attempting to provision the infrastructure resource with the updated configuration.

In response to receiving the trigger, at block 804, CIOS Regional 504 determines if a rollback plan for the plan can be automatically executed. A rollback plan can be automatically executed in instances when CIOS Regional 504 can determine the configuration values to roll back to. However, a rollback plan cannot be automatically executed when there have been no previously successful invocations for the target (i.e., is no known good configuration to roll back to). A rollback plan cannot be automatically executed in instances when a new version of a deployed software artifact (i.e., application/code) changes a database schema to a different schema that an earlier version of the software artifact is not aware of or cannot support. Other instances in which a rollback plan cannot be automatically executed include, but are not limited to, rollback operations that result in the deployment of unsupported software, when a version of software to roll back to is no longer supported (e.g. because a service the application depends on has had its endpoint, protocol, or API changed, and the old version to rollback to uses a deprecated endpoint, protocol, or API), when rolling back would destroy stateful infrastructure, e.g. if rolling back would delete a database that was created during the roll forward and which now contains customer data and so on.

If a rollback plan cannot be automatically executed, at block 808, CIOS Regional 504 transmits an alert to a user of CIOS Central 502 to indicate the error (i.e., a failure) in the execution of the plan. Various different techniques may be used to transmit an alert to a user. In certain embodiments, and as shown in FIG. 9, a user interface (UI) 900 may be presented to the user (e.g., user 514 in FIG. 1) by CIOS Central 502 as part of the workflow performed by the apply plan/apply rollback plan service 509. In certain examples, and as will be described in FIG. 9, the UI may be updated to display alert information (e.g., a failed status 946) along with other information associated with the execution of a plan. In response to the alert information, user 514 can manually inspect the executed plan to determine if the plan can be safely rolled back or "reverted" to a previous version/state of the infrastructure resources that existed prior to the execution of the plan.

At block 810, user input from a user is received. For example, as shown in FIG. 9, a user 514 may use UI 900 to select an option (e.g., 947) to send a request to CIOS Central 502 to execute a rollback plan for the plan by selecting a "rollback plan" option via the UI.

At block 812, CIOS Regional 504 executes the rollback plan in response to the user input. In certain examples, executing the rollback plan involves performing the following operations:

(1) A rollback operation that rolls back (i.e., reverts) the plan to a previous version that identifies the first state of the set of infrastructure assets defined in the plan prior to the execution of the plan; and (2) A roll-forward operation that re-executes the plan to achieve the second state of the set of infrastructure assets.

Additionally, in some examples, a user may be able to specify different deployment orderings in the execution of a plan which in turn can determine the order of execution of the rollback and/or roll-forward operations executed for the plan. For instance, a roll-forward operation may be configured with one deployment ordering, but a rollback operation may be configured with a different deployment ordering. Alternatively, or in addition, a rollback operation may include a first deployment ordering, and subsequent rollback operations may be configured with different orderings in the rollback plan. By way of example, a deployment ordering may specify a dependency between a set of infrastructure assets (e.g., applications) to be provisioned and/or deployed as part of executing a roll forward operation. For instance, a deployment ordering in a plan may specify that application A should be deployed prior to applications B and C since applications B and C both depend on application A. However, a rollback operation may be executed in the reverse order by executing rollback operations to restore the state of the infrastructure resources associated with the deployment of applications C and B respectively prior to executing a rollback operation to restore the state of the infrastructure resources associated with application A.

In certain examples, the rollback plan executed by CIOS Regional 504 may be executed for an "infrastructure release plan" or for an "application release plan." A rollback plan for an "infrastructure release plan" may involve determining if a provisioned set of infrastructure resources can be safely and successfully rolled back to a previous version of the "infrastructure release plan" followed by a successful re-execution (roll-forward) of the plan to achieve the second state of the set of infrastructure resources (i.e., the provisioned set of infrastructure resources). A rollback plan for an "application release plan" may involve determining if a deployed set of software artifacts can be safely and successfully rolled back to a previous version of the "application release plan" followed by a successful re-execution (roll-forward) of the plan to achieve the second state of the deployed set of software artifacts.

At block 814, the result of the execution of the rollback plan is transmitted to the user via the user interface of CIOS Central 502. By way of example, the result may indicate a successful or a failed execution of the rollback plan to the user.

If a rollback plan can be automatically executed at block 804, in certain examples, at block 806, CIOS Regional 504 automatically executes the rollback plan and transmits the result of the execution to a user via a user interface of CIOS Central 502.

FIG. 9 depicts a schematic diagram of an example user interface (UI) 900, according to at least one embodiment. The UI 900 can include any suitable combination of an infrastructure area 902, an application area 904, and a task area 906. The UI 900 can include the infrastructure area 902, the application area 904, and the task area 906 as depicted and arranged in FIG. 9, or these areas may be differently arranged within the UI 900.

The infrastructure area 902 can be located at any suitable location of the UI 900. As depicted in FIG. 9, the infrastructure area 902 is positioned in the upper left corner of the UI 900. The infrastructure area 902 can include infrastructure release data (e.g., a release name, a number of execution targets to which the infrastructure components of the release are to be provisioned, one or more indicators of progress associated with performing the release, an indicator of the latest infrastructure release, and the like) corresponding to any suitable number of infrastructure releases. As noted above in the description of FIG. 2, a "release" may be used to refer to a specific version of a flock configuration. A release contains a plan per region and metadata describing region ordering. Each plan comprises a set of operations (set of declarative instructions) a declarative provisioner would take to realize the flock configuration in that region.

As depicted, the infrastructure area 902 presents infrastructure release data corresponding to six releases entitled "Lovable," "Excited," "Elegant," "Nuclear," "Strange," and "Aqueous." Entry 908 presents infrastructure release data corresponding to the release "Lovable" and includes a percentage (e.g., 75%) and a progress bar 910, each indicating that 75% of the release has been performed. It should be appreciated that the percentage and the progress bar 910 are example user interface elements for depicting release progress, but that any suitable user interface element may be utilized to represent such progress (e.g., visually, textually, etc.). By way of example, the progress of a corresponding infrastructure release may additionally, or alternatively, be represented by a number, a chart, or any other suitable user interface element for displaying progress. In some embodiments, a particular infrastructure release may be identified as a latest release using label 912 or another suitable user interface element including an icon, a checkmark, or the like. As depicted in FIG. 9, entry 908 includes a target count indicating a number of execution targets (e.g., 15) to which infrastructure components corresponding to the Lovable release are to be provisioned. It is contemplated that the infrastructure release data provided in each entry of the infrastructure area 902 may be differently arranged and may include more or less attributes of the infrastructure release data corresponding to each release than the number of attributes depicted in FIG. 9.

In some embodiments, the UI 900 may include the application area 904. The application area 904 can be located at any suitable location of the UI 900. In the example depicted in FIG. 9, the application area 904 is positioned in the upper right corner of the UI 900. The application area 904 can include application release data (e.g., an application release name, a number of execution targets to which software artifacts of the release are to be deployed, one or more indicators of progress associated with performing the release (e.g., deploying the software artifacts), an indicator of the latest application release, and the like) corresponding to any suitable number of application releases. As depicted, the application area 904 presents application release data corresponding to six application releases entitled "Chuck," "Bob," "Felipe," "Asa," "Strange," and "Errol." Entry 914 presents application release data corresponding to the application release "Chuck" and includes a percentage (e.g., 60%) and a progress bar 916 indicating that 60% of the application release has been performed. It should be appreciated that the percentage and the progress bar 916 are example user interface elements for depicting application release progress, but that any suitable user interface element may be utilized to represent such progress (e.g., visually, textually, etc.). By way of example, the progress of a corresponding application release may additionally, or alternatively be represented by a number, a chart, or any other suitable user interface element for displaying progress. In some embodiments, a particular infrastructure release may be identified as a latest release using label 918 or another suitable user interface element including an icon, a checkmark, or the like. As depicted in FIG. 9, entry 914 includes a target count indicating a number of execution targets (e.g., 12) to which artifacts (e.g., application code) corresponding to the Chuck release are to be provisioned. It is contemplated that the application release data provided in each entry of the application area 904 may be differently arranged and may include more or fewer attributes of the application release data corresponding to each release.

In some embodiments, the UI 900 may include the task area 906. The task area 906 can be located at any suitable location of the UI 900. In the example depicted in FIG. 9, it is positioned toward the lower half of the UI 900. The task area 906 can include target release information corresponding to each execution target of a flock. Each execution target of the examples provided herein may correspond to a region. A region in the examples herein may comprise at least one physical location. The target release information can include an identifier for an infrastructure release, a status (e.g., a visual representation of status) corresponding to the progress of provisioning to the execution target the infrastructure components of the infrastructure release, an identifier for an application release, and a status (e.g., a visual representation of status) indicating the progress of deploying artifacts (e.g., application code) corresponding to that application release. The task area 906 can include any suitable number and combination of columns such as an execution target column 920, infrastructure change column 922, and/or application change column 924. The execution target column 920 can be organized by phases, where phases can indicate an order by which releases (e.g., including provisioning a set of infrastructure components and/or deploying a set of software artifacts) are to be performed across execution targets. In the UI 900, there are four phases depicted: phase I, phase II, phase III, and phase IV. In some embodiments, phase I must be completed before the deployment enters phase II, phase II before phase III, and so on. As depicted phases I and II include one execution target each, phase III includes 4 execution targets, and phase IV includes 12 execution targets. The execution targets can be applied in parallel.

Each row of the task area 906 may correspond to a phase and/or an execution target. By way of example, entry 926 may correspond to a phase (e.g., phase I) and a single execution target of that phase. Entry 928 may correspond to phase III. Entry 930 may correspond to phase IV. By default, the entries corresponding to the execution targets of a phase may be hidden. Selection of an entry corresponding to a phase may cause rows corresponding to corresponding execution targets of that phase to appear. By way of example, entry 932 may be initially hidden and only entry 930 may be displayed. In some embodiments, once entry 930 is selected, entry 932 may be presented. The entry 932 depicts a particular execution target/region of phase IV to which an infrastructure release (e.g., "Lovable") and an application release (e.g., "Chuck") correspond.

The infrastructure change column 922 can include a name of an infrastructure release and a status of the infrastructure release for each phase or execution target. In some embodiments, a phase which includes more than one execution target may correspond to one or more infrastructure and/or application releases. Thus, in some embodiments, infrastructure change column 922 may include data indicating a number of differing infrastructure releases utilized by the execution targets of a phase. By way of example, indicator 934 may be presented to indicate that there are three different infrastructure releases to be released to the execution targets of phase IV. Status indicators 936 may also be presented within infrastructure change column to indicate a status for each infrastructure release to each execution target of the phase. The status indicators 936 may individually indicate that releases to one or more execution targets has encountered an error, is in progress, or has completed. Similarly, application change column 924 can include indicator 938 to indicate one application release is to be utilized for every execution target of phase IV and status indicator 940 to indicate a status of each application release for each execution target of phase IV. For entries corresponding to a single execution target (e.g., entry 932), the infrastructure change column 922 may present the name of the infrastructure release and a status. In some embodiments, the status (e.g., "Done," "Failed," "In Progress," "Pending Review," or the like) may be presented textually as depicted in FIG. 9 or the status may be presented differently. For entries corresponding to a single execution target, the application change column 924 can similarly include a name of an application release (e.g., "Chuck") and a status of the application release (e.g., "Done," "Failed," "In Progress," "Pending Review," or the like). The statuses displayed for an application release can be the same or different from the statuses provided for an infrastructure release. In some embodiments, selecting an entry (e.g., selecting entry 942) may cause the entry to be visually modified (e.g., a background of the entry may be modified) to indicate the selection. One example modification corresponding to selection of entry 942 is depicted in FIG. 9.

In some embodiments, if the release fails in at least one aspect, the status of this failure may be indicated at the UI 900. By way of example, a failure of infrastructure component provisioning is indicated at 946 and a failure of a software artifact deployment is indicated at 948. In some embodiments, in response to detecting a failure of an infrastructure component provisioning, user input may be received to execute a rollback of an infrastructure release by selecting an "infrastructure rollback plan" button 947 via the UI 900. Similarly, in response to detecting a failure of a software artifact deployment, user input may be received to execute a rollback of an application release by selecting an "application rollback plan" button 949 via the UI 900. In other examples, in response to detecting a failure, the user may additionally be provided other options such as, for instance, to perform a remedial action (e.g., reattempting the provisioning and/or deployment task corresponding to the execution target, canceling the provisioning and/or deployment task corresponding to the execution target, modifying the provisioning and/or deployment task corresponding to the execution target, and the like).

Illustrative Systems

Figure 10:
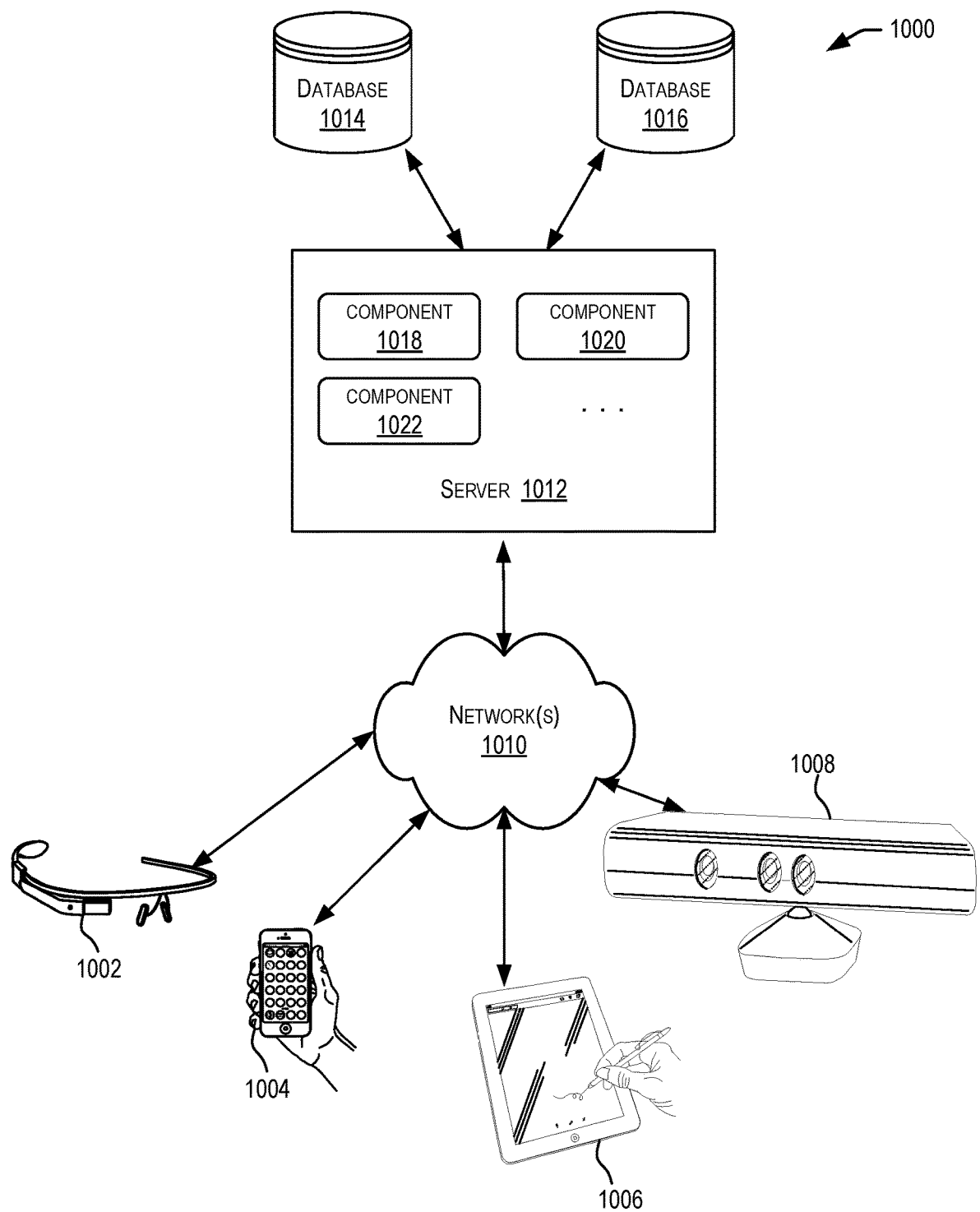
FIG. 10 is a block diagram of a distributed system, according to at least one embodiment.
Figure 11:
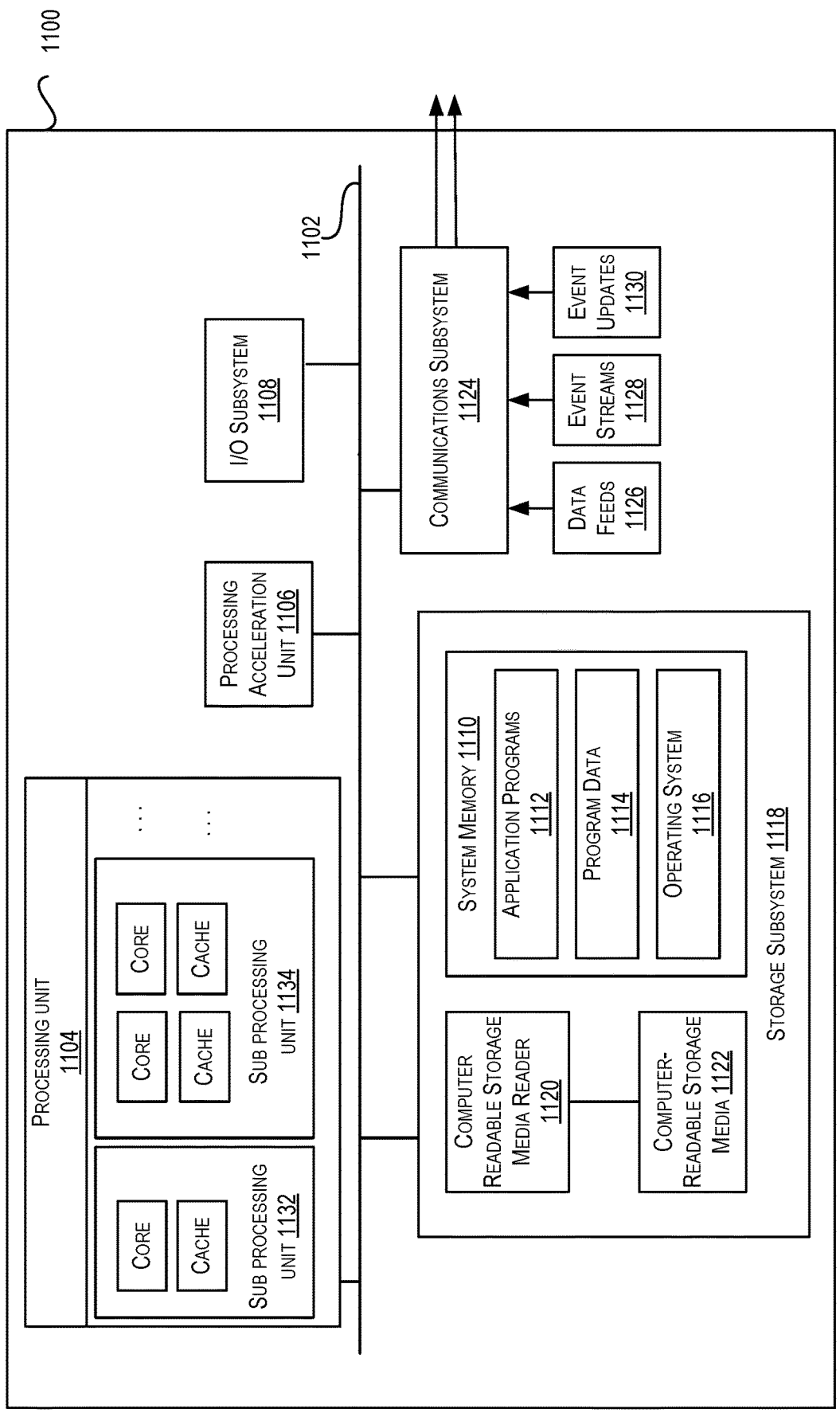
FIG. 11 is a block diagram of an example computer system, in which various embodiments of the present disclosure may be implemented.
Figure 12:
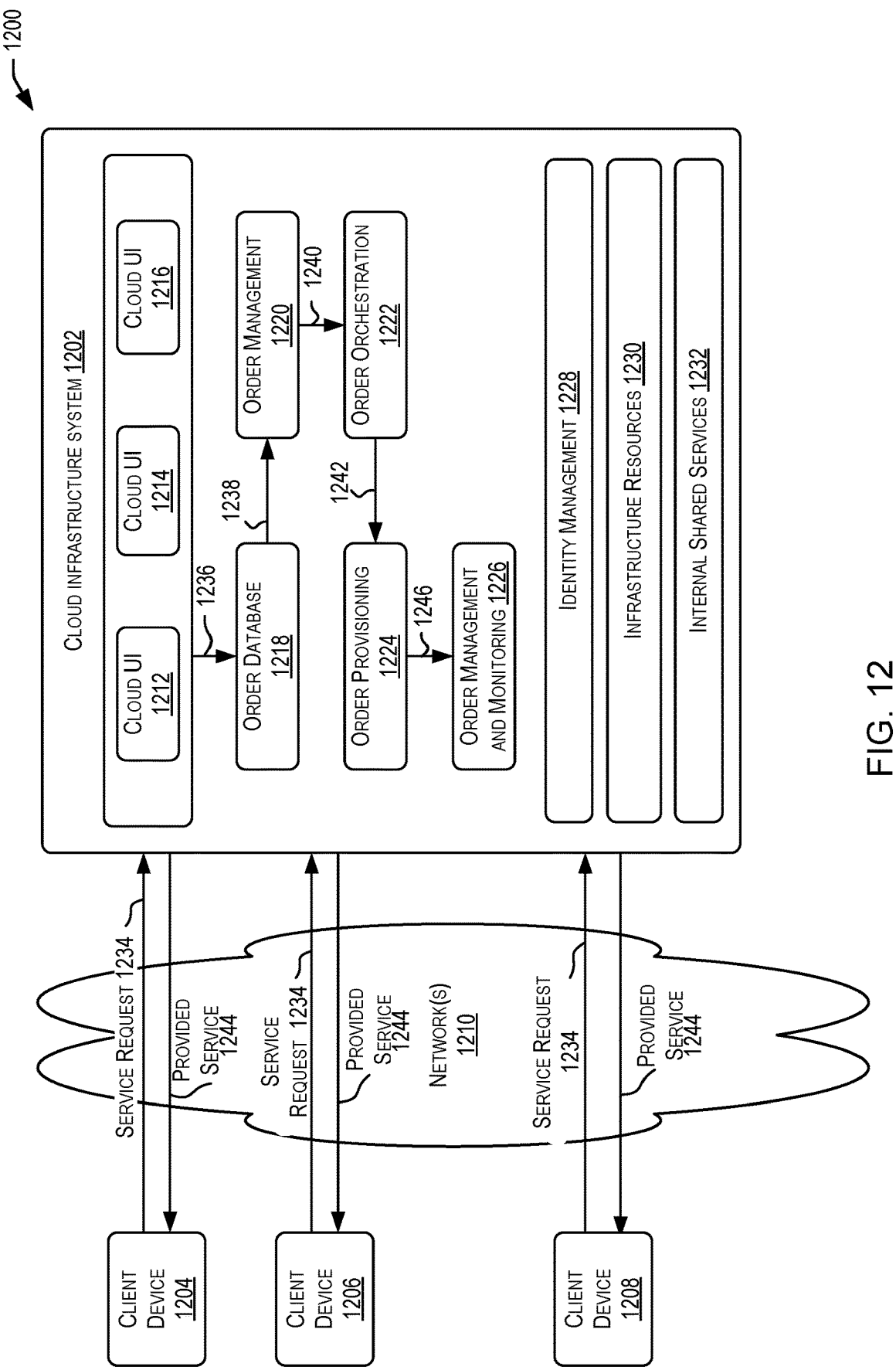
FIG. 12 is a block diagram of one or more components of a system environment by which services provided by one or more components of an embodiment system may be offered as cloud services, according to at least one embodiment.

FIGS. 10-12 illustrate aspects of example environments for implementing aspects of the present disclosure in accordance with various embodiments. FIG. 10 depicts a simplified diagram of a distributed system 1000 for implementing an embodiment of the present disclosure. In the illustrated embodiment, the distributed system 1000 includes one or more client computing devices 1002, 1004, 1006, and 1008, which are configured to execute and operate a client application such as a web browser, proprietary client (e.g., Oracle Forms), or the like over one or more network(s) 1010. The server 1012 may be communicatively coupled with the remote client computing devices 1002, 1004, 1006, and 1008 via network 1010.

In various embodiments, the server 1012 may be adapted to run one or more services or software applications such as services and applications that provide resource provisioning and deployment services. In certain embodiments, the server 1012 may also provide other services or software applications can include non-virtual and virtual environments. In some embodiments, these services may be offered as web-based or cloud services or under a Software as a Service (SaaS) model to the users of the client computing devices 1002, 1004, 1006, and/or 1008. Users operating the client computing devices 1002, 1004, 1006, and/or 1008 may in turn utilize one or more client applications to interact with the server 1012 to utilize the services provided by these components.

In the configuration depicted in FIG. 10, the software components 1018, 1020 and 1022 of system 1000 are shown as being implemented on the server 1012. In other embodiments, one or more of the components of the system 1000 and/or the services provided by these components may also be implemented by one or more of the client computing devices 1002, 1004, 1006, and/or 1008. Users operating the client computing devices may then utilize one or more client applications to use the services provided by these components. These components may be implemented in hardware, firmware, software, or combinations thereof. It should be appreciated that various different system configurations are possible, which may be different from distributed system 1000. The embodiment shown in FIG. 10 is thus one example of a distributed system for implementing an embodiment system and is not intended to be limiting.

The client computing devices 1002, 1004, 1006, and/or 1008 may include various types of computing systems. For example, client device may include portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like. The devices may support various applications such as various Internet-related apps, e-mail, short message service (SMS) applications, and may use various other communication protocols. The client computing devices may also include general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Client computing devices may also include electronic devices such as a thin-client computer, an Internet-enabled gaming system (e.g., a Microsoft Xbox gaming console with or without a Kinect® gesture input device), and/or a personal messaging device, capable of communicating over the network(s) 1010.

Although distributed system 1000 in FIG. 10 is shown with four client computing devices, any number of client computing devices may be supported. Other devices, such as devices with sensors, etc., may interact with the server 1012.

The network(s) 1010 in the distributed system 1000 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk, and the like. Merely by way of example, the network(s) 1010 can be a local area network (LAN), networks based at least in part on Ethernet, Token-Ring, a wide-area network, the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

The server 1012 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. The server 1012 can include one or more virtual machines running virtual operating systems, or other computing architectures involving virtualization. One or more flexible pools of logical storage devices can be virtualized to maintain virtual storage devices for the server. Virtual networks can be controlled by the server 1012 using software defined networking. In various embodiments, the server 1012 may be adapted to run one or more services or software applications described in the foregoing disclosure. For example, the server 1012 may correspond to a server for performing processing as described above according to an embodiment of the present disclosure.

The server 1012 may run an operating system including any of those discussed above, as well as any commercially available server operating system. Server 1012 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Example database servers include without limitation those commercially available from Oracle, Microsoft, Sybase, IBM (International Business Machines), and the like.

In some implementations, the server 1012 may include one or more applications to analyze and consolidate data feeds and/or event updates received from users of the client computing devices 1002, 1004, 1006, and 1008. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. The server 1012 may also include one or more applications to display the data feeds and/or real-time events via one or more display devices of the client computing devices 1002, 1004, 1006, and 1008.

The distributed system 1000 may also include one or more databases 1014 and 1016. These databases may provide a mechanism for storing information such as user identity information, configuration files, state information and other information used by embodiments of the present disclosure. Databases 1014 and 1016 may reside in a variety of locations. By way of example, one or more of databases 1014 and 1016 may reside on a non-transitory storage medium local to (and/or resident in) the server 1012. Alternatively, the databases 1014 and 1016 may be remote from the server 1012 and in communication with the server 1012 via a network-based or dedicated connection. In one set of embodiments, the databases 1014 and 1016 may reside in a storage-area network (SAN). Similarly, any necessary files for performing the functions attributed to the server 1012 may be stored locally on the server 1012 and/or remotely, as appropriate. In one set of embodiments, the databases 1014 and 1016 may include relational databases, such as databases provided by Oracle, that are adapted to store, update, and retrieve data in response to SQL-formatted commands.

FIG. 11 illustrates an example computer system 1100 that may be used to implement an embodiment of the present disclosure. In some embodiments, computer system 1100 may be used to implement any of the various servers and computer systems described above. As shown in FIG. 11, computer system 1100 includes various subsystems including a processing subsystem 1104 that communicates with a number of peripheral subsystems via a bus subsystem 1102. These peripheral subsystems may include a processing acceleration unit 1106, an I/O subsystem 1108, a storage subsystem 1118 and a communications subsystem 1124.

Storage subsystem 1118 may include tangible computer-readable storage media 1122 and a system memory 1110.

Bus subsystem 1102 provides a mechanism for letting the various components and subsystems of computer system 1100 communicate with each other as intended. Although bus subsystem 1102 is shown schematically as a single bus, alternative embodiments of the bus subsystem may utilize multiple buses. Bus subsystem 1102 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 1104 controls the operation of computer system 1100 and may comprise one or more processing units 1132, 1134, etc. A processing unit may include be one or more processors, including single core or multicore processors, one or more cores of processors, or combinations thereof. In some embodiments, processing subsystem 1104 can include one or more special purpose co-processors such as graphics processors, digital signal processors (DSPs), or the like. In some embodiments, some or all of the processing units of processing subsystem 1104 can be implemented using customized circuits, such as application specific integrated circuits (ASICs), or field programmable gate arrays (FPGAs).

In some embodiments, the processing units in processing subsystem 1104 can execute instructions stored in system memory 1110 or on computer readable storage media 1122. In various embodiments, the processing units can execute a variety of programs or code instructions and can maintain multiple concurrently executing programs or processes. At any given time, some or all of the program code to be executed can be resident in system memory 1110 and/or on computer-readable storage media 1110 including potentially on one or more storage devices. Through suitable programming, processing subsystem 1104 can provide various functionalities described above for dynamically modifying documents (e.g., webpages) responsive to usage patterns.

In certain embodiments, a processing acceleration unit 1106 may be provided for performing customized processing or for off-loading some of the processing performed by processing subsystem 1104 so as to accelerate the overall processing performed by computer system 1100.

I/O subsystem 1108 may include devices and mechanisms for inputting information to computer system 1100 and/or for outputting information from or via computer system 1100. In general, use of the term "input device" is intended to include all possible types of devices and mechanisms for inputting information to computer system 1100. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1100 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 1118 provides a repository or data store for storing information that is used by computer system 1100. Storage subsystem 1118 provides a tangible non-transitory computer-readable storage medium for storing the basic programming and data constructs that provide the functionality of some embodiments. Software (programs, code modules, instructions) that when executed by processing subsystem 1104 provide the functionality described above may be stored in storage subsystem 1118. The software may be executed by one or more processing units of processing subsystem 1104. Storage subsystem 1118 may also provide a repository for storing data used in accordance with the present disclosure.

Storage subsystem 1118 may include one or more non-transitory memory devices, including volatile and non-volatile memory devices. As shown in FIG. 11, storage subsystem 1118 includes a system memory 1110 and a computer-readable storage media 1122. System memory 1110 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 1100, such as during start-up, may be stored in the ROM. The RAM may contain data and/or program modules that are presently being operated and executed by processing subsystem 1104. In some implementations, system memory 1110 may include multiple different types of memory, such as static random access memory (SRAM) or dynamic random access memory (DRAM).

By way of example, and not limitation, as depicted in FIG. 11, system memory 1110 may store application programs 1112, which may include client applications, Web browsers, mid-tier applications, relational database management systems (RDBMS), etc., program data 1114, and an operating system 1116. By way of example, operating system 1116 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 1122 may store programming and data constructs that provide the functionality of some embodiments. Software (programs, code modules, instructions) that when executed by processing subsystem 1104 a processor provide the functionality described above may be stored in storage subsystem 1118. By way of example, computer-readable storage media 1122 may include non-volatile memory such as a hard disk drive, a magnetic disk drive, an optical disk drive such as a CD ROM, DVD, a Blu-Ray® disk, or other optical media. Computer-readable storage media 1122 may include, but is not limited to, Zip® drives, flash memory cards, universal serial bus (USB) flash drives, secure digital (SD) cards, DVD disks, digital video tape, and the like. Computer-readable storage media 1122 may also include, solid-state drives (SSD) based at least in part on non-volatile memory such as flash-memory based SSDs, enterprise flash drives, solid state ROM, and the like, SSDs based at least in part on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 1122 may provide storage of computer-readable instructions, data structures, program modules, and other data for computer system 1100.

In certain embodiments, storage subsystem 1100 may also include a computer-readable storage media reader 1120 that can further be connected to computer-readable storage media 1122. Together and, optionally, in combination with system memory 1110, computer-readable storage media 1122 may comprehensively represent remote, local, fixed, and/or removable storage devices plus storage media for storing computer-readable information.

In certain embodiments, computer system 1100 may provide support for executing one or more virtual machines. Computer system 1100 may execute a program such as a hypervisor for facilitating the configuring and managing of the virtual machines. Each virtual machine may be allocated memory, compute (e.g., processors, cores), I/O, and networking resources. Each virtual machine may run its own operating system, which may be the same as or different from the operating systems executed by other virtual machines executed by computer system 1100. Accordingly, multiple operating systems may potentially be run concurrently by computer system 1100. Each virtual machine generally runs independently of the other virtual machines.

Communications subsystem 1124 provides an interface to other computer systems and networks. Communications subsystem 1124 serves as an interface for receiving data from and transmitting data to other systems from computer system 1100. For example, communications subsystem 1124 may enable computer system 1100 to establish a communication channel to one or more client devices via the Internet for receiving and sending information from and to the client devices. Additionally, communication subsystem 1124 may be used to communicate notifications of successful logins or notifications to re-enter a password from the privileged account manager to the requesting users.

Communication subsystem 1124 may support both wired and/or wireless communication protocols. For example, in certain embodiments, communications subsystem 1124 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1124 can provide wired network connectivity (e.g., Ethernet) in addition to or instead of a wireless interface.

Communication subsystem 1124 can receive and transmit data in various forms. For example, in some embodiments, communications subsystem 1124 may receive input communication in the form of structured and/or unstructured data feeds 1126, event streams 1128, event updates 1130, and the like. For example, communications subsystem 1124 may be configured to receive (or send) data feeds 1126 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 1124 may be configured to receive data in the form of continuous data streams, which may include event streams 1128 of real-time events and/or event updates 1130, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1124 may also be configured to output the structured and/or unstructured data feeds 1126, event streams 1128, event updates 1130, and the like to one or more databases that may be in communication with one or more streaming data source computers coupled to computer system 1100.

Computer system 1100 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Due to the ever-changing nature of computers and networks, the description of computer system 1100 depicted in FIG. 11 is intended only as a specific example. Many other configurations having more or fewer components than the system depicted in FIG. 11 are possible. Based at least in part on the disclosure and teachings provided herein, a person of ordinary skill in the art will appreciate other ways and/or methods to implement the various embodiments.

Systems depicted in some of the figures may be provided in various configurations. In some embodiments, the systems may be configured as a distributed system where one or more components of the system are distributed across one or more networks in one or more cloud infrastructure systems.

A cloud infrastructure system is a collection of one or more server computing devices, network devices, and/or storage devices. These resources may be divided by cloud services providers and allotted to its customers in some manner. For example, a cloud services provider, such as Oracle Corporation of Redwood Shores, California, may offer various types of cloud services including but not limited to one or more services provided under Software as a Service (SaaS) category, services provided under Platform as a Service (PaaS) category, services provided under Infrastructure as a Service (IaaS) category, or other categories of services including hybrid services. Examples of SaaS services include, without limitation, capabilities to build and deliver a suite of on-demand applications such as Oracle Fusion applications. SaaS services enable customers to utilize applications executing on the cloud infrastructure system without the need for customers to purchase software for the applications. Examples of PaaS services include without limitation services that enable organizations (such as Oracle) to consolidate existing applications on a shared, common architecture, as well as the ability to build new applications that leverage the shared services provided by the platform such as Oracle Java Cloud Service (JCS), Oracle Database Cloud Service (DBCS), and others. IaaS services may facilitate the management and control of the underlying computing resources, such as storage, networks, and other fundamental computing resources for customers utilizing services provided by the SaaS platform and the PaaS platform.

FIG. 12 is a simplified block diagram of one or more components of a system environment 1200 by which services provided by one or more components of an embodiment system may be offered as cloud services, in accordance with an embodiment of the present disclosure. In the illustrated embodiment, system environment 1200 includes one or more client computing devices 1204, 1206, and 1208 that may be used by users to interact with a cloud infrastructure system 1202 that provides cloud services. The client computing devices may be configured to operate a client application such as a web browser, a proprietary client application (e.g., Oracle Forms), or some other application, which may be used by a user of the client computing device to interact with cloud infrastructure system 1202 to use services provided by cloud infrastructure system 1202.

It should be appreciated that cloud infrastructure system 1202 depicted in the figure may have other components than those depicted. Further, the embodiment shown in the figure is only one example of a cloud infrastructure system that may incorporate an embodiment of the disclosure. In some other embodiments, cloud infrastructure system 1202 may have more or fewer components than shown in the figure, may combine two or more components, or may have a different configuration or arrangement of components.

Client computing devices 1204, 1206, and 1208 may be devices similar to those described above for 802, 804, 806, and 808.

Although example system environment 1200 is shown with three client computing devices, any number of client computing devices may be supported. Other devices such as devices with sensors, etc. may interact with cloud infrastructure system 1202.

Network(s) 1210 may facilitate communications and exchange of data between clients 1204, 1206, and 1208 and cloud infrastructure system 1202. Each network may be any type of network familiar to those skilled in the art that can support data communications using any of a variety of commercially-available protocols, including those described above for network(s) 1010.

Cloud infrastructure system 1202 may comprise one or more computers and/or servers that may include those described above for server 1012.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet or from a cloud service provider's system is referred to as a "cloud service." In a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1202 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 1202 may be adapted to automatically provision, manage and track a customer's subscription to services offered by cloud infrastructure system 1202. Cloud infrastructure system 1202 may provide the cloud services via different deployment models. For example, services may be provided under a public cloud model in which cloud infrastructure system 1202 is owned by an organization selling cloud services (e.g., owned by Oracle) and the services are made available to the general public or different industry enterprises. As another example, services may be provided under a private cloud model in which cloud infrastructure system 1202 is operated solely for a single organization and may provide services for one or more entities within the organization. The cloud services may also be provided under a community cloud model in which cloud infrastructure system 1202 and the services provided by cloud infrastructure system 1202 are shared by several organizations in a related community. The cloud services may also be provided under a hybrid cloud model, which is a combination of two or more different models.

In some embodiments, the services provided by cloud infrastructure system 1202 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1202. Cloud infrastructure system 1202 then performs processing to provide the services in the customer's subscription order.

In some embodiments, the services provided by cloud infrastructure system 1202 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1202 may also include infrastructure resources 1230 for providing the resources used to provide various services to customers of the cloud infrastructure system. In one embodiment, infrastructure resources 1230 may include pre-integrated and optimized combinations of hardware, such as servers, storage, and networking resources to execute the services provided by the PaaS platform and the SaaS platform.

In some embodiments, resources in cloud infrastructure system 1202 may be shared by multiple users and dynamically re-allocated per demand. Additionally, resources may be allocated to users in different time zones. For example, cloud infrastructure system 1230 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1232 may be provided that are shared by different components or modules of cloud infrastructure system 1202 and by the services provided by cloud infrastructure system 1202. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1202 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1202, and the like.

In one embodiment, as depicted in the figure, cloud management functionality may be provided by one or more modules, such as an order management module 1220, an order orchestration module 1222, an order provisioning module 1224, an order management and monitoring module 1226, and an identity management module 1228. These modules may include or be provided using one or more computers and/or servers, which may be general purpose computers, specialized server computers, server farms, server clusters, or any other appropriate arrangement and/or combination.

In example operation 1234, a customer using a client device, such as client device 1204, 1206 or 1208, may interact with cloud infrastructure system 1202 by requesting one or more services provided by cloud infrastructure system 1202 and placing an order for a subscription for one or more services offered by cloud infrastructure system 1202. In certain embodiments, the customer may access a cloud User Interface (UI), cloud UI 1212, cloud UI 1214 and/or cloud UI 1216 and place a subscription order via these UIs. The order information received by cloud infrastructure system 1202 in response to the customer placing an order may include information identifying the customer and one or more services offered by the cloud infrastructure system 1202 that the customer intends to subscribe to.

After an order has been placed by the customer, the order information is received via the cloud UIs, 1212, 1214 and/or 1216.

At operation 1236, the order is stored in order database 1218. Order database 1218 can be one of several databases operated by cloud infrastructure system 1218 and operated in conjunction with other system elements.

At operation 1238, the order information is forwarded to an order management module 1220. In some instances, order management module 1220 may be configured to perform billing and accounting functions related to the order, such as verifying the order, and upon verification, booking the order.

At operation 1240, information regarding the order is communicated to an order orchestration module 1222. Order orchestration module 1222 may utilize the order information to orchestrate the provisioning of services and resources for the order placed by the customer. In some instances, order orchestration module 1222 may orchestrate the provisioning of resources to support the subscribed services using the services of order provisioning module 1224.

In certain embodiments, order orchestration module 1222 enables the management of business processes associated with each order and applies business logic to determine whether an order should proceed to provisioning. At operation 1242, upon receiving an order for a new subscription, order orchestration module 1222 sends a request to order provisioning module 1224 to allocate resources and configure those resources needed to fulfill the subscription order. Order provisioning module 1224 enables the allocation of resources for the services ordered by the customer. Order provisioning module 1224 provides a level of abstraction between the cloud services provided by cloud infrastructure system 1200 and the physical implementation layer that is used to provision the resources for providing the requested services. Order orchestration module 1222 may thus be isolated from implementation details, such as whether or not services and resources are actually provisioned on the fly or pre-provisioned and only allocated/assigned upon request.

At operation 1244, once the services and resources are provisioned, a notification of the provided service may be sent to customers on client devices 1204, 1206 and/or 1208 by order provisioning module 1224 of cloud infrastructure system 1202. At operation 1246, the customer's subscription order may be managed and tracked by an order management and monitoring module 1226. In some instances, order management and monitoring module 1226 may be configured to collect usage statistics for the services in the subscription order, such as the amount of storage used, the amount data transferred, the number of users, and the amount of system up time and system down time.

In certain embodiments, cloud infrastructure system 1200 may include an identity management module 1228. Identity management module 1228 may be configured to provide identity services, such as access management and authorization services in cloud infrastructure system 1200. In some embodiments, identity management module 1228 may control information about customers who wish to utilize the services provided by cloud infrastructure system 1202. Such information can include information that authenticates the identities of such customers and information that describes which actions those customers are authorized to perform relative to various system resources (e.g., files, directories, applications, communication ports, memory segments, etc.) Identity management module 1228 may also include the management of descriptive information about each customer and about how and by whom that descriptive information can be accessed and modified.

Although specific embodiments of the disclosure have been described, various modifications, alterations, alternative constructions, and equivalents are also encompassed within the scope of the disclosure. Embodiments of the present disclosure are not restricted to operation within certain specific data processing environments, but are free to operate within a plurality of data processing environments. Additionally, although embodiments of the present disclosure have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments of the present disclosure have been described using a particular combination of hardware and software, it should be recognized that other combinations of hardware and software are also within the scope of the present disclosure. Embodiments of the present disclosure may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

What is claimed is:

1. A computer-implemented method, comprising:
    executing, by a computer system, a regional service for provisioning a set of infrastructure assets of an execution target of a central infrastructure orchestration service;
    receiving, by the computer system, a plan comprising at least one of a first set of declarative instructions for provisioning the set of infrastructure assets of the execution target or a second set of declarative instructions for deploying a set of software artifacts onto the set of provisioned infrastructure assets of the execution target from the central infrastructure orchestration service;
    identifying, by the computer system, a first state of the set of infrastructure assets;
    executing, by the computer system, at least one of the first set of declarative instructions or the second set of declarative instructions in the plan to achieve a second state for the set of infrastructure assets;
    based at least in part on the executing, receiving, by the computer system, a trigger for rolling back the plan to restore the set of infrastructure assets in the plan to the first state, wherein the trigger identifies an error detected during deployment of at least one software artifact of the set of infrastructure assets of the execution target;
    in accordance with receiving the trigger, executing, by the computer system, a rollback plan for the plan; and
    transmitting, by the computer system, a result associated with the execution of the rollback plan.

2. The computer-implemented method of claim 1, wherein the execution target is associated with a predefined region managed by the central infrastructure orchestration service and comprises at least one physical location for provisioning the set of infrastructure assets.

3. The computer-implemented method of claim 1, wherein the execution target is associated with a predefined region comprising at least one physical location for deploying the set of software artifacts.

4. The computer-implemented method of claim 1, wherein the trigger identifies a configuration parameter in a configuration file of the plan that indicates that the plan is being executed in a pre-production test environment.

5. The computer-implemented method of claim 4, further comprising automatically executing, by the computer system, the rollback plan for the plan based on the identified configuration parameter.

6. The computer-implemented method of claim 5, wherein automatically executing, by the computer system, the rollback plan comprises:
    executing a rollback operation to roll back the plan to a previous version that identifies the first state of the set of infrastructure assets defined in the plan prior to the execution of the plan; and
    executing a roll-forward operation to re-execute the plan to achieve the second state of the set of infrastructure assets.

7. The computer-implemented method of claim 1, wherein trigger identifies an error detected during provisioning of at least one infrastructure asset of the set of infrastructure assets of the execution target; and
    responsive to receiving the trigger, automatically executing, by the computer system, the rollback plan.

8. The computer-implemented method of claim 7, wherein the error is caused as a result of an update to a configuration of the infrastructure asset during the execution of the plan, wherein the update is performed by a user of the computer system.

9. The computer-method of claim 1, further comprising:
    responsive to receiving the trigger, automatically executing, by the computer system, the rollback plan.

10. The computer-implemented method of claim 1, wherein the trigger identifies an error detected during provisioning of at least one infrastructure asset of the set of infrastructure assets of the execution target; and
    responsive to receiving the trigger:
        transmitting, by the computing system, an indication of the error to a user interface;
        responsive to the indication of the error, receiving, by the computing system, user input indicative of executing the rollback plan; and
        executing, by the computing system, the rollback plan in response to the user input.

11. The computer-implemented method of claim 1, wherein
    responsive to receiving the trigger:
        transmitting, by the computing system, an indication of the error to a user interface;
        responsive to the indication of error, receiving, by the computing system, user input indicative of executing the rollback plan for the plan; and
        executing, by the computing system, the rollback plan in response to the user input.

12. A cloud infrastructure orchestration system, comprising:
a processor; and
a memory storing instructions that, when executed by the processor, configure the cloud infrastructure orchestration system to:
execute a regional service for provisioning a set of infrastructure assets of an execution target of a central infrastructure orchestration service;
receive a plan comprising at least one of a first set of declarative instructions for provisioning the set of infrastructure assets of the execution target or a second set of declarative instructions for deploying a set of software artifacts onto the set of provisioned infrastructure assets of the execution target from the central infrastructure orchestration service;
identify a first state of the set of infrastructure assets;
execute at least one of the first set of declarative instructions or the second set of declarative instructions in the plan to achieve a second state for the set of infrastructure assets;
based at least in part on the instructions to execute, receive a trigger for rolling back the plan to restore the set of infrastructure assets in the plan to the first state, wherein the trigger identifies an error detected during deployment of at least one software artifact of the set of infrastructure assets of the execution target;
based at least in part on the instructions to receive, execute a rollback plan for the plan; and
provide a result associated with the execution of the rollback plan.

13. The system of claim 12, wherein the execution target is associated with a predefined region managed by the central infrastructure orchestration service and comprises at least one physical location for provisioning the set of infrastructure assets.

14. The system of claim 12, wherein the execution target is associated with a predefined region comprising at least one physical location for deploying the set of software artifacts.

15. The system of claim 12, wherein the trigger identifies an error detected during provisioning of at least one infrastructure asset of the set of infrastructure assets of the execution target; and
responsive to receiving the trigger, automatically executing, by the computer system, the rollback plan.

16. The system of claim 12, wherein the trigger identifies an error detected during provisioning of at least one infrastructure asset of the set of infrastructure assets of the execution target; and
responsive to receiving the trigger:
transmitting, by the computing system, an indication of the error to a user interface;
responsive to the indication of the error, receiving user input indicative of executing the rollback plan; and
executing the rollback plan in response to the user input.

17. A non-transitory computer-readable medium having program code that is stored thereon, the program code executable by one or more processing devices for performing operations comprising:
executing a regional service for provisioning a set of infrastructure assets of an execution target of a central infrastructure orchestration service;
receiving a plan comprising at least one of a first set of declarative instructions for provisioning the set of infrastructure assets of the execution target or a second set of declarative instructions for deploying a set of software artifacts onto the set of provisioned infrastructure assets of the execution target from the central infrastructure orchestration service;
identifying a first state of the set of infrastructure assets;
executing at least one of the first set of declarative instructions or the second set of declarative instructions in the plan to achieve a second state for the set of infrastructure assets;
based at least in part on the executing, receiving a trigger for rolling back the plan to restore the set of infrastructure resources in the plan to the first state, wherein the trigger identifies an error detected during deployment of at least one software artifact of the set of infrastructure assets of the execution target;
based at least in part on the receiving, executing a rollback plan for the plan; and
providing a result associated with the execution of the rollback plan via a user interface of the computer system.

18. The computer-readable storage medium of claim 17, wherein trigger identifies a configuration parameter in a configuration file of the plan that indicates that the plan is being executed in a pre-production test environment.

19. The computer-readable storage medium of claim 18 further comprising automatically executing the rollback plan for the plan based on the identified configuration parameter.

20. The computer-readable storage medium of claim 19, wherein automatically executing the rollback plan comprises:
executing a rollback operation to roll back the plan to a previous version that identifies the first state of the set of infrastructure assets defined in the plan prior to the execution of the plan; and
executing a roll-forward operation to re-execute the plan to achieve the second state of the set of infrastructure assets.

* * * * *